United States Patent [19]
Noda

[11] Patent Number: 5,604,864
[45] Date of Patent: Feb. 18, 1997

[54] METHOD AND SYSTEM FOR DETECTING INVALID ACCESS TO A MEMORY

[75] Inventor: Katsuhiko Noda, Hirakata, Japan

[73] Assignee: Sumitomo Metal Industries, Ltd., Osaka, Japan

[21] Appl. No.: 447,704

[22] Filed: May 23, 1995

[30] Foreign Application Priority Data

May 26, 1994 [JP] Japan .................................. 6-112872

[51] Int. Cl.$^6$ .................................................. G06F 11/00
[52] U.S. Cl. ...................... 395/184.01; 395/411; 395/427
[58] Field of Search ........................ 395/182.07, 183.03, 395/184.01, 186, 187.01, 188.01, 411, 427, 481

[56] References Cited

U.S. PATENT DOCUMENTS

| | | | |
|---|---|---|---|
| 3,673,569 | 6/1972 | Hedin et al. | 340/149 |
| 4,719,566 | 1/1988 | Kelley | 364/200 |
| 4,761,772 | 8/1988 | Murakami | 369/32 |
| 5,023,773 | 6/1991 | Baun et al. | 364/200 |
| 5,113,499 | 5/1992 | Ankney et al. | 395/325 |
| 5,193,180 | 5/1993 | Hastings | 395/375 |
| 5,237,616 | 8/1993 | Abraham et al. | 380/49 |
| 5,249,276 | 9/1993 | Honmura et al. | 395/400 |
| 5,289,540 | 2/1994 | Jones | 380/4 |
| 5,293,594 | 3/1994 | Nojiri et al. | 395/400 |
| 5,303,360 | 4/1994 | Hilton et al. | 395/425 |
| 5,404,499 | 4/1995 | Nichols | 395/185.07 |

FOREIGN PATENT DOCUMENTS 0620523  10/1994  European Pat. Off. .
2100190  12/1982  United Kingdom .

*Primary Examiner*—Hoa T. Nguyen
*Attorney, Agent, or Firm*—Burns, Doane, Swecker & Mathis, LLP

[57] ABSTRACT

A method and system for detecting an invalid access to a memory in a user program, in which an inaccessible area is set and a real memory area corresponding to the inaccessible area is obtained in response to a request for allocating a dynamic memory in a user program. In translating an address in the inaccessible area into an address in the real memory area with an address translation table, it is found whether or not the requested access is invalid.

18 Claims, 25 Drawing Sheets

METHOD AND SYSTEM FOR DETECTING INVALID ACCESS TO A MEMORY

BACKGROUND OF THE INVENTION

1. Field of the Invention

The present invention relates to a method and system for detecting an invalid access to a memory so as to debug or the like of a computer program. More particularly, the present invention relates to a method and system for automatically detecting an invalid access to a dynamically allocated memory caused by any defect in a user program incorporated in various tools such as a software development tool, a defect investigation tool and a quality examination/improvement tool that are operated in a computer system where the user program allows dynamic allocation/deallocation of a memory as the process requests.

2. Description of Related Art

As a programming language, Fortran and Cobol are in common use but in recent years C and C++ languages are becoming more popular. The C and C++ languages are advantageously flexible in that they can directly call services in the used system and directly describe a memory operation and the like. On the other hand, when the system is mistakenly used or the program has a defect or error, the direct call for services in the system and the direct memory operation is likely to involve inconveniences resulting in the inoperation of the computer. In order to avoid such inconveniences or dangers, the program must be constantly debugged. In line with increases in the computing speed and the memory capacity, the scale of a software is becoming large, which makes it difficult to detect defects in the programs.

In the case of improper or ineffective use of a memory, an invalid access, such as an access to a wrong page which is not allocated in the program, is automatically detected by a Page Memory Management Unit (PMMU).

The PMMU is a device for, in an address space of a processor that is divided into predetermined units (i.e., pages), setting an access right to each page, managing an allocation state of a physical memory to a virtual memory when the virtual memory is used, and translating a virtual logical address into a physical address. The PMMUs can be built in a processor. A dynamic memory allocation facility for allocating a memory to a program in need is packaged by using the PMMU. Furthermore, in order to enable the operating system to control the PMMU operating system, a page management table that stores the allocation of the physical memory in each page and the setting of an access right in each page is used.

The PMMU is disadvantageous in that it cannot detect an invalid access within any page allocated to the writing of a program; for example, an access beyond the range of an array data, and a copy of a data larger than a memory area dynamically allocated to the program. Such invalid accesses are likely to cause secondary defects such as damage to the other data.

Now, examples of improper accesses to the memory will be described in details:

(1) Memory access beyond a range of a dynamically allocated memory:

For example, where a memory with 10 bytes is dynamically allocated to an address 1000, a writing to an address 999 may destroy previous, other data. Similarly, a writing to an address 1011 may destroy other, subsequent data. In either case, an unexpected data is read in a reading operation, which can result in secondary nonconformity when another instruction is executed based on the read data.

(2) Execution of a read instruction before executing a write instruction in a dynamically allocated memory:

A dynamically allocated memory has an undefined content when allocated. When such a dynamically allocated memory is read before writing, the undefined data is read. As a result, secondary nonconformity can be caused when another instruction is executed based on the read data.

(3) Access to a dynamically allocated memory that has already been deallocated:

A program dynamically allocates a memory in need for processing, and deallocates the memory when the need is lost. Although an access to the deallocated memory is inhibited in principle, when the deallocated memory is accessed or a request for deallocating that memory is issued again, an unexpected situation is brought about.

The memories to be used in a program are roughly divided into two kinds, an instruction area memory and a data area memory. The instruction area memory is generally used for read only, and there is no possibility that the instruction area memory is damaged by the nonconformity of a program. Therefore, it is the data area memory that can be damaged by the nonconformity of a program. The data to be used in a program are divided into the following three kinds: a static data, a stack data and a dynamically allocated data.

The static data is always allocated to a fixed address. The stack data is allocated in the order of call in each function (i.e., subroutine), and hence, the stack data having the same orders in the functions are allocated to the same addresses. Furthermore, a data defined as a static/stack data is allocated in the order of declaration and is aligned on a memory in the order of the allocation. Therefore, when a static/stack data is found to be damaged, an instruction having damaged the data can be comparatively easily identified by tracing instructions operating the previous and subsequent data of the damaged data (i.e., data defined in front and behind of the damaged data).

The dynamically allocated data is allocated in need for processing, and hence, it can be allocated to different addresses depending upon various conditions including the size of the data and the operating environment. Furthermore, the position of the dynamically allocated data on a memory is not necessarily in accordance with the order of the allocation. Therefore, when a dynamically allocated data is found to be damaged, it is necessary to identify the previous and subsequent data of the damaged data in order to trace the instruction operating these data. Thus, it is more difficult to identify the instruction that has damaged the data.

U.S. Pat. No. 5,193,180 discloses a device for detecting any defect in using a memory. This device comprises means for retrieving memory access instructions in an object program so as to insert an instruction string for checking the address of a memory to be accessed, in front and behind of each of the retrieved memory access instructions; means for inserting a dummy data between respective data in the memory so as to break an accessible area; means for generating a control data used for checking purpose; means for evaluating the validity of an access on the basis of the management data; and means for adjusting a shift of an inaccessed address due to the insert of the instruction string and the dummy data.

As is evident from the foregoing description, the destruction of the static data and the stack data is comparatively easily detected as compared with that of the dynamically allocated data. The device of the aforementioned U.S.

patent, however, checks all the memory accesses, and does not respond to a request of program developers that checking time should be shortened by merely checking the dynamically allocated data. The aforementioned U.S. patent only describes how to check the propriety of an access to the dynamically allocated memory but fails to describe any means for effecting the check. This is because the memory access instructions in a relocatable object file or an executable file are statically retrieved in the device disclosed in this U.S. patent.

SUMMARY OF THE INVENTION

The present invention is directed to solve the problems pointed out above, and is to provide a method and system for detecting an invalid access in which a PMMU is effectively utilized for detecting an invalid access to a dynamically allocated memory alone.

According to one aspect of the present invention, there is a method and system for detecting an invalid memory access of this invention, an inaccessible area is set and a real memory area corresponding to the inaccessible area is obtained in response to a request for allocating a dynamic memory in a user program, and an address translation table for translating an address in the inaccessible area into an address in the real memory area is created. In executing the user program, it is determined whether or not the access to an address is invalid based on the address for accessing the dynamic memory in the user program, the address in the inaccessible area and the address translation table.

According to another aspect of the present invention, there is a method and system for detecting an invalid memory access, wherein a warning is generated when a status flag of the address translation table, the status flag indicating a used or unused state of the real memory area subject to the address translation table, indicates that the real memory is in the unused status with respect to the address to be accessed, and in addition, the status flag in a corresponding area in the address translation table can placed in the unused status in response to a request for deallocating a dynamic memory.

Accordingly, the following improper or invalid accesses can be detected:

A memory access beyond the range of a dynamically allocated memory;

Execution of a read instruction before executing a write instruction in a dynamically allocated memory; and An access to a dynamically allocated memory that has already been deallocated.

Furthermore, since the present invention checks neither a static data nor a stack data, the hardware does not need a space of accommodating a system for checking these data, thereby shortening an execution time of a user program.

The above and further objects and features of the invention will more fully be apparent from the following detailed description with accompanying drawings.

DESCRIPTION OF THE PREFERRED EMBODIMENTS

The present invention will now be described referring to the accompanying drawings. A PMMU is utilized to practice the invention, and hence, the general operation of the PMMU is first described so as to facilitates the understanding of the present invention.

Figure 1:
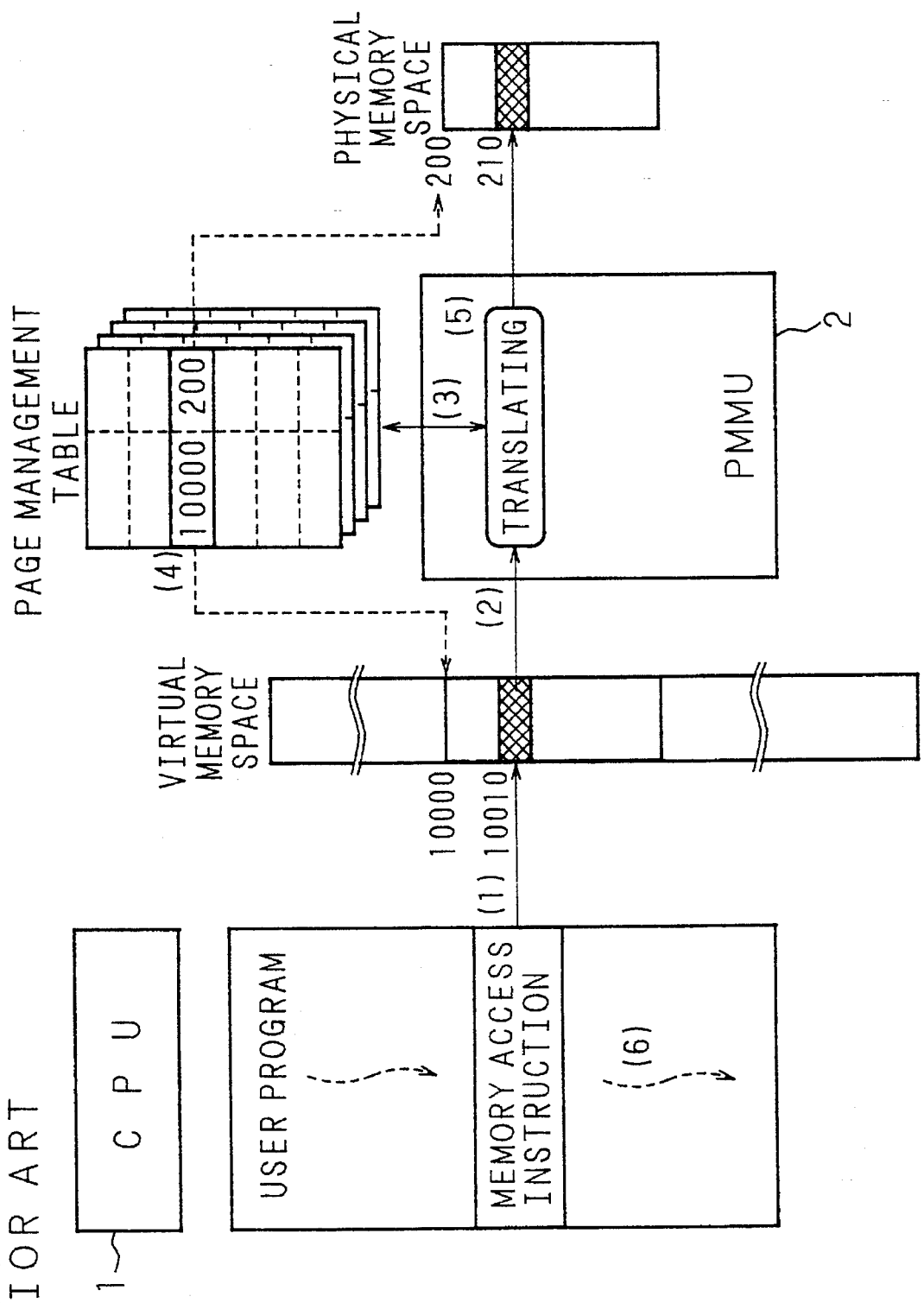
FIG. 1 is a diagram of a conventional memory access.

FIG. 1 is a diagram of a conventional memory access, in which reference numerals 1 and 2 denote a CPU and a PMMU, respectively. It is assumed that an address 10010 in a virtual memory space is transferred from an address bus of the CPU 1 in executing an access instruction (1) to a dynamically allocated memory in a user program. The PMMU 2 receives the virtual address 10010 (2), and retrieves the entry of a page to which the virtual address belongs (i.e., a page with a leading address 10000) in a page management table (which is stored in an appropriate area in a memory) (3). It is assumed that this retrieve finds an entry indicating that the page to which the virtual address 10010 belongs is mapped on a page starting with a physical address 200 (4). Then, the PMMU 2 translates the virtual address 10010 into the physical address 210 (5), to which an access is made. Then, a subsequent instruction is executed.

In the present invention, a virtual address to be accessed in a user program is previously defined to be inaccessible in the page management table. In executing the user program, when a memory is accessed, the PMMU finds out that the memory is inaccessible based on the page management table. Then, the PMMU interrupts the CPU and activates an interrupt handler. Through this interrupt process, it is found whether or not the address to be accessed is valid. Then, the address is translated into an accessible virtual address, which is supplied to the PMMU, so as to allow the PMMU to translate the virtual address into a physical address.

Figure 2:
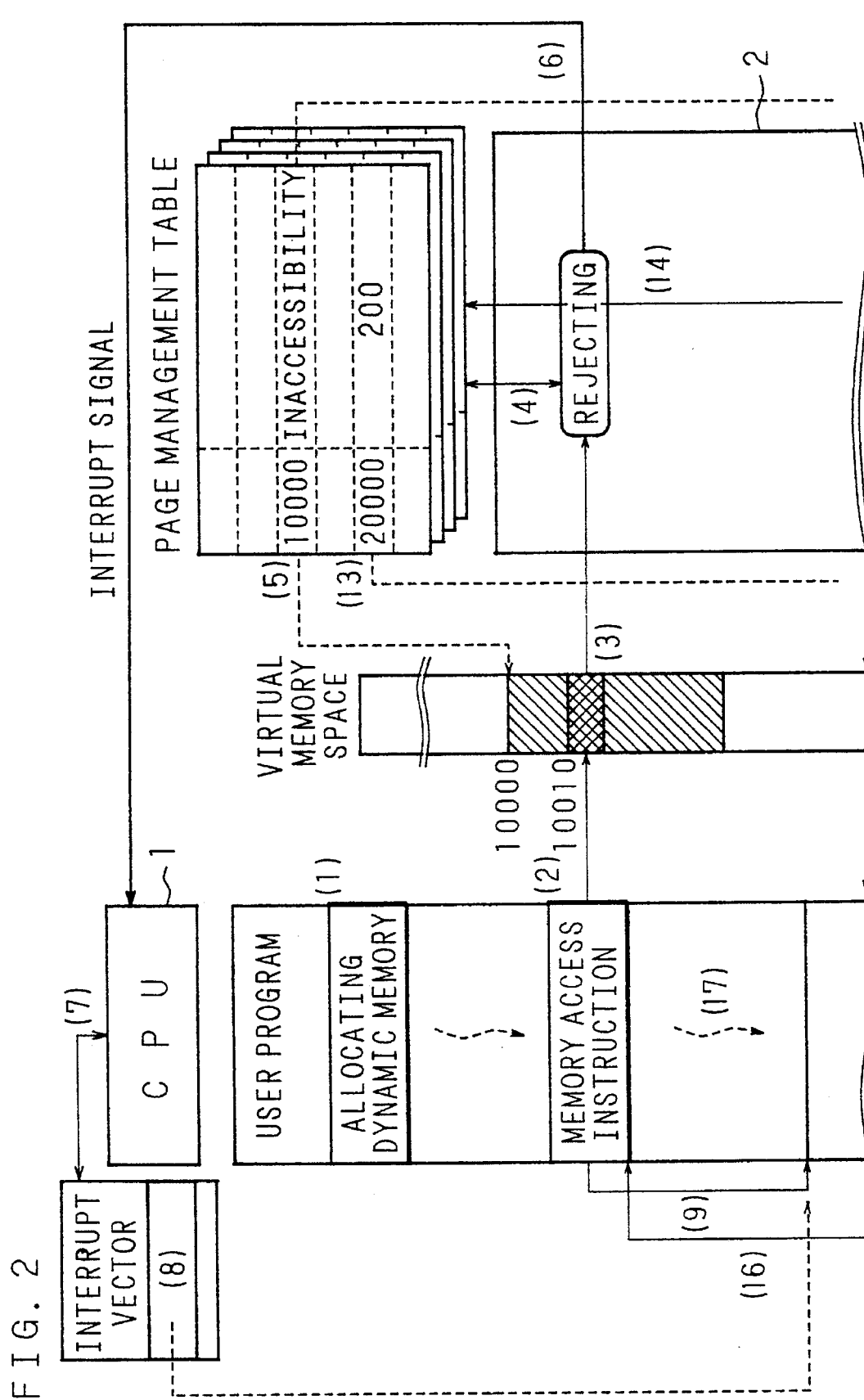
FIG. 2 is a diagram of a memory access in the present invention.
Figure 3:
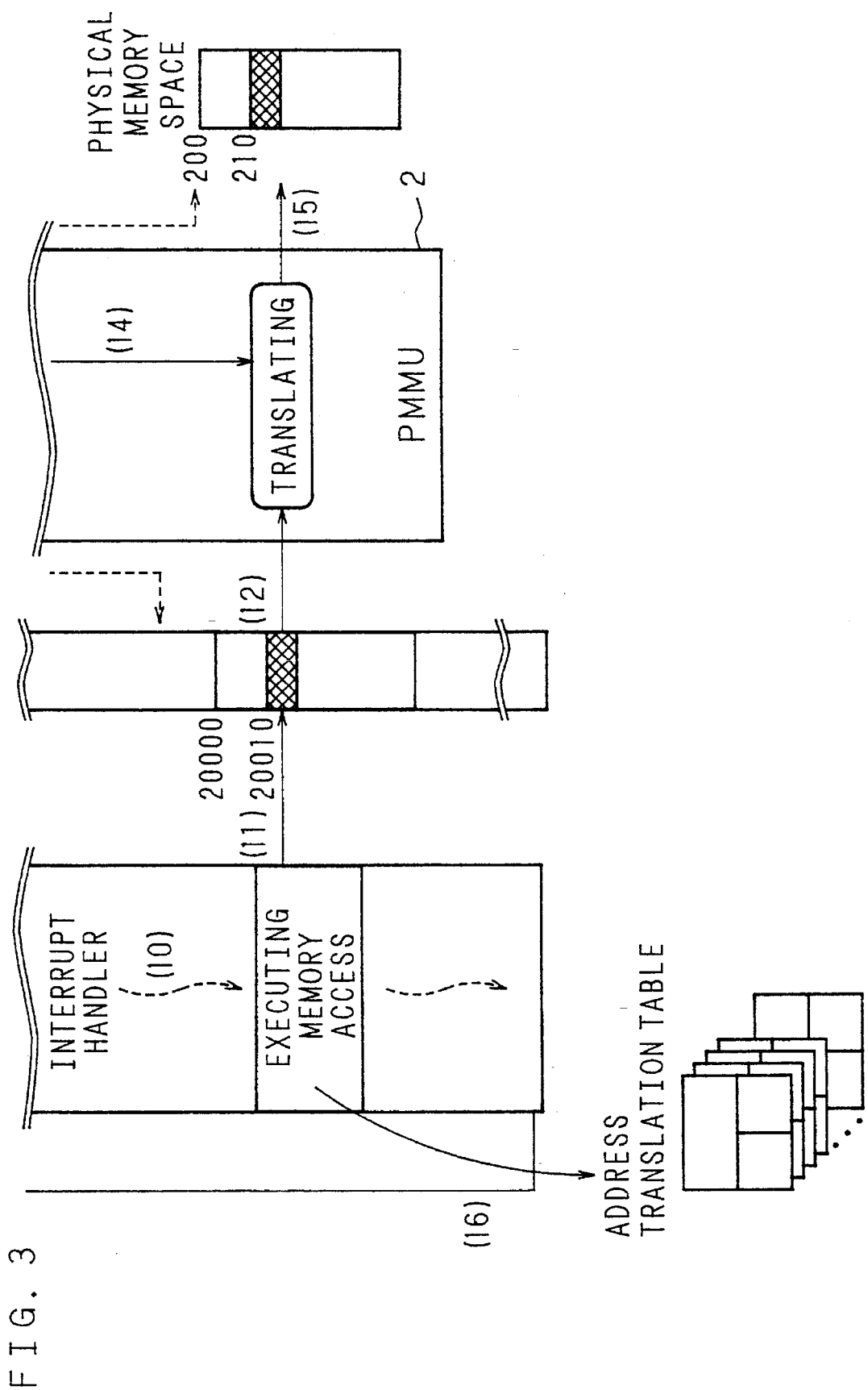
FIG. 3 is another diagram of a memory access in the present invention.

FIGS. 2 and 3 are diagrams of the invention, which illustrate, in particular, the execution of an access instruction in detail. When a request for allocating a dynamic memory is made in executing a user program (1), an inaccessible area is set. Furthermore, a real memory area (general dynamically allocated memory area) to be paired with the inaccessible area is obtained. The page management table is created based on these areas, so that a virtual address to be accessed in the user program is defined to be inaccessible in the page management table. The real memory area is allocated so as to correspond to a virtual address to be used in the interrupt handler. Then, an address translation table for obtaining the virtual address is created based on whether or not an address to be accessed in the user program is valid and on the address. The details of the set of the inaccessible area and the obtainment of the corresponding real memory area, and the creation and the content of the address translation table will be described in detail below.

It is now assumed that an address 10010 in a virtual memory space is transferred from an address bus of the CPU 1 in executing an access instruction (2) to a dynamically allocated memory in the user program. The PMMU 2 receives the virtual address 10010 (3), and retrieves the entry of a page to which the virtual address belongs (i.e., a page with a leading address 10000) in the page management table (4). Then, the PMMU 2 finds an entry indicating inaccessibility according to the invention (5).

The PMMU 2 hardware-interrupts the CPU 1 due to the invalid page access (6). This interrupt function is generally provided to a conventional PMMU.

The CPU 1 retrieves an interrupt handler corresponding to this interrupt in an interrupt vector (7). When a corresponding interrupt handler is found (8), this interrupt handler is controlled (9). In the interrupt handler (10), the address 10010 to be accessed is retrieved for in the address translation table. Then, it is determined whether or not the address is valid, and a warning is generated when it is invalid. When it is valid, the address 10010 is translated into an actually allocated virtual address, for example, a virtual address 20010, based on the address translation table. This address is transferred from the address bus of the CPU 1 (11). The PMMU 2 receives the virtual address 20010 (12), and retrieves the entry of a page to which the virtual address belongs (i.e., a page with a leading address 20000) in the page management table (13). It is assumed that this retrieve finds an entry indicating that the page to which the virtual address 20010 belongs is mapped on a page starting with a physical address 200 (14). Then, the virtual address 20010 is translated into the physical address 210 (15), to which an access is made. Then, the control is returned to the user program (16) so as to execute a subsequent instruction (17).

In the aforementioned process, an access to an invalid address can be detected in the interrupt handler, more specifically, by referring to the address translation table.

In order to practice the invention, the following facility realizing means are required:

(1) Dynamic memory allocating/deallocating facility replacing means:

A dynamic memory allocating facility of a general system library provided to a computer cannot perform the aforementioned set of an inaccessible area and the like. Therefore, in a computer for debugging a user program according to the invention, it is necessary to replace the library so that the general dynamic memory allocating facility does not work but the allocation of the invention can be performed, and so with the deallocating facility corresponding to the allocating facility.

This means is provided for such replacement.

(2) Dynamic memory allocating means:

In response to a request of the user program for allocating a dynamic memory, dynamic memory allocating means allocates a dynamic memory by using address translation table creating means and inaccessible area address informing means described below.

(3) Address translation table creating means:

In response to the request for allocating a dynamic memory, the address translation table creating means sets an inaccessible area and obtains a real memory area in a paired manner, and creates the address translation table to be used for translating an address in the inaccessible area into an address in the real memory area.

(4) Inaccessible area address informing means:

In response to the request for allocating a dynamic memory, an address in the inaccessible area set by the address translation table creating means is informed the user program, thereby allowing the user program to detect an accessing point to the dynamically allocated memory.

(5) Dynamic memory deallocating means:

In response to a request for deallocating a dynamic memory, dynamic memory deallocating means places a corresponding memory area in a deallocated unused status by operating the address translation table.

(6) Inaccessible area access detecting means:

When an access is made to the inaccessible address informed the user program by the inaccessible area address informing means, inaccessible area access detecting means retrieves the address to be accessed in the address translation table, thereby detecting an invalid access.

(7) Address translation executing means:

On the basis of the result of the retrieve by the inaccessible area access detecting means, address translation executing means translates an inaccessible address into a real address, thereby executing the access.

The aforementioned facility realizing means are formed with software. Therefore, the present invention will now be described from a view point of the operation of a dynamic memory, referring to the drawings illustrating a program structure.

Figure 4:
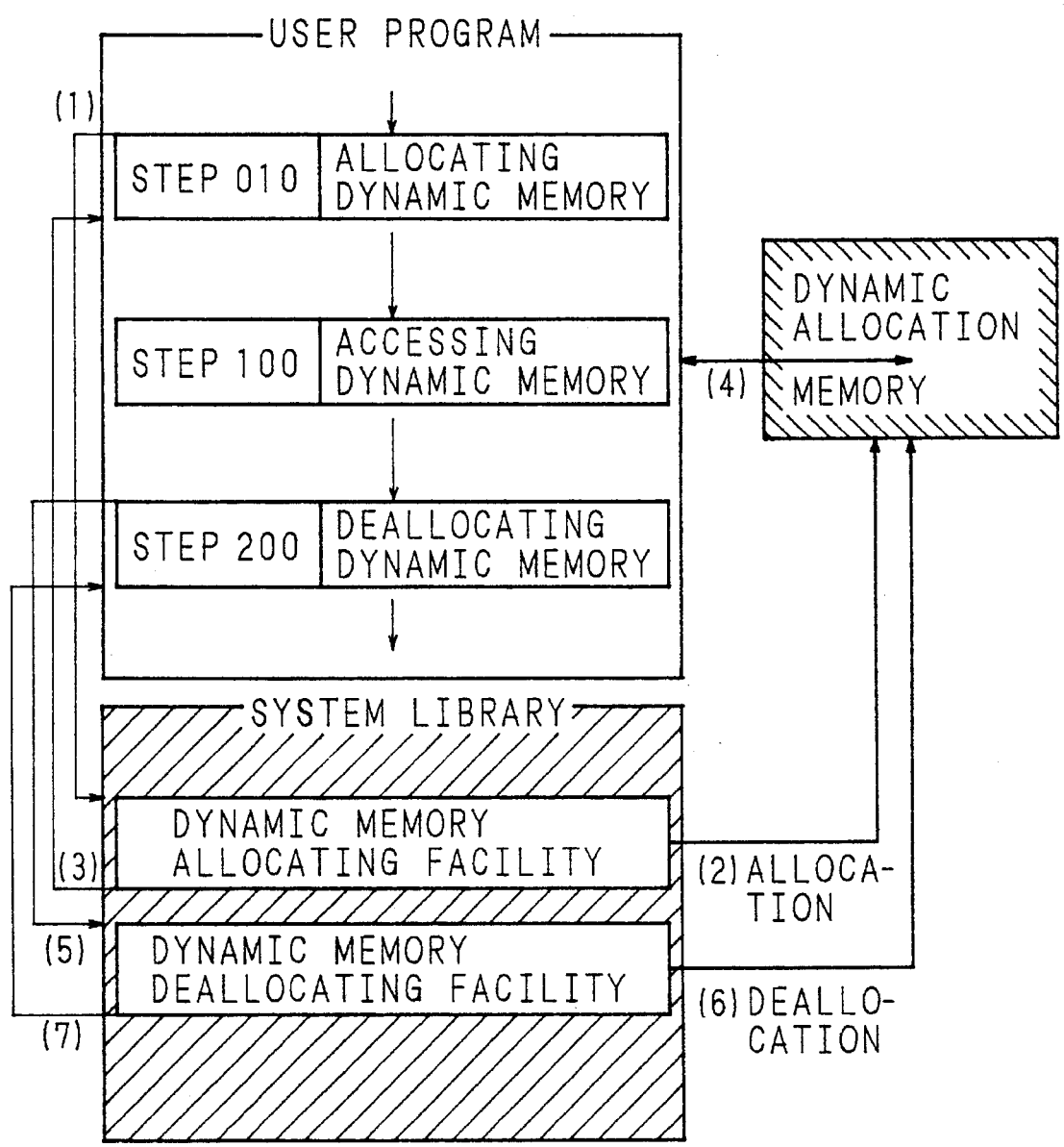
FIG. 4 is a diagram of the operation of a ordinal dynamic memory.

First, a conventional operation of a dynamic memory will be described referring to FIG. 4, so as to facilitate the understanding of the invention.

Step 010:

The user program calls the dynamic memory allocating facility from a system library (1). In response to the call by the user program, the dynamic memory allocating facility is activated to actually allocate a dynamic memory (2), and informs the user program of the address of the allocated dynamic memory (3).

Step 100:

The user program accesses the dynamically allocated memory so as to refer or write a data in the memory (4). The address to be accessed is the address informed in Step 010.

Step 200:

The user program designates the address informed in Step 010 as an area to be deallocated, and calls the dynamic memory deallocating facility from the system library (5). In response to the call by the user program, the dynamic memory deallocating facility is activated to deallocate the designated area (6), and the procedure returns to the user program (7).

Figure 5:
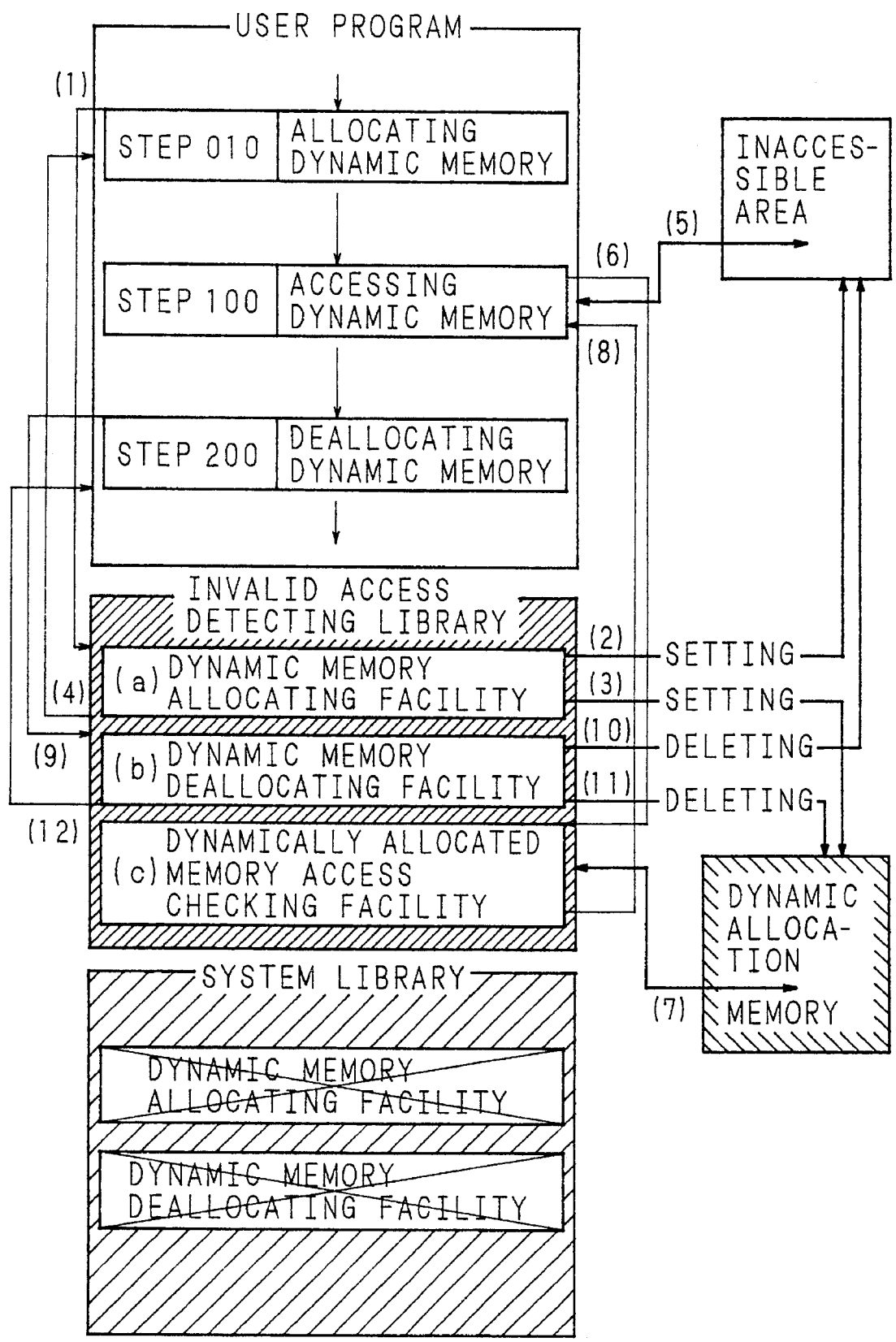
FIG. 5 is a diagram of the operation of a dynamic memory of the invention.

Next, the operation of a dynamic memory in accordance with the invention will be described referring to FIG. 5 so as to make clear a difference from the aforementioned conventional one. FIG. 5 is a diagram of the operation of a dynamic memory in the invention. The dynamic memory allocating means, the address translation table creating means and the inaccessible area address informing means described above are realized as a dynamic memory allocating facility (a) in a replacement library, that is, a software according to the invention. The dynamic memory deallocating means is similarly realized as a dynamic memory deallocating facility (b), and the inaccessible area access detecting means and the address translation executing means are similarly realized as a dynamically allocated memory access checking facility (c). In executing the user program, not the dynamic memory allocating/deallocating facilities of the system library inherently provided to the computer system but the replacement library is activated.

The operation of a dynamic memory accompanied with the execution of the user program will now be described.

Step 010:

The user program calls the dynamic memory allocating facility (1). In response to the call by the user program, the dynamic memory allocating facility (a) in the replacement library is activated to set an inaccessible area (2) and actually allocates the dynamic memory (3). The address of the inaccessible area is informed (4).

Step 100:

The user program accesses to the dynamically allocated memory so as to refer and write a data in the memory (5). The address to be accessed is the address of the inaccessible area informed in Step 010, and hence, the PMMU 2 detects the access to an inaccessible area as described referring to FIGS. 2 and 3, thereby calling the dynamically allocated memory access checking facility (c) (6). In the dynamically allocated memory access checking facility (c), after checking the validity of the address to be accessed, the actually allocated dynamic memory is accessed (7). Then, the procedure returns to the user program (8).

Step 200:

The user program designates the address informed in Step 010 as an area to be deallocated, and calls the dynamic memory deallocating facility (b) (9). In response to the call by the user program, the dynamic memory deallocating facility is activated. After checking the validity of the address to be deallocated, the inaccessible area is deleted (10) and the real dynamic memory is deleted (11). Then, the procedure returns to the user program (12).

Figure 6:
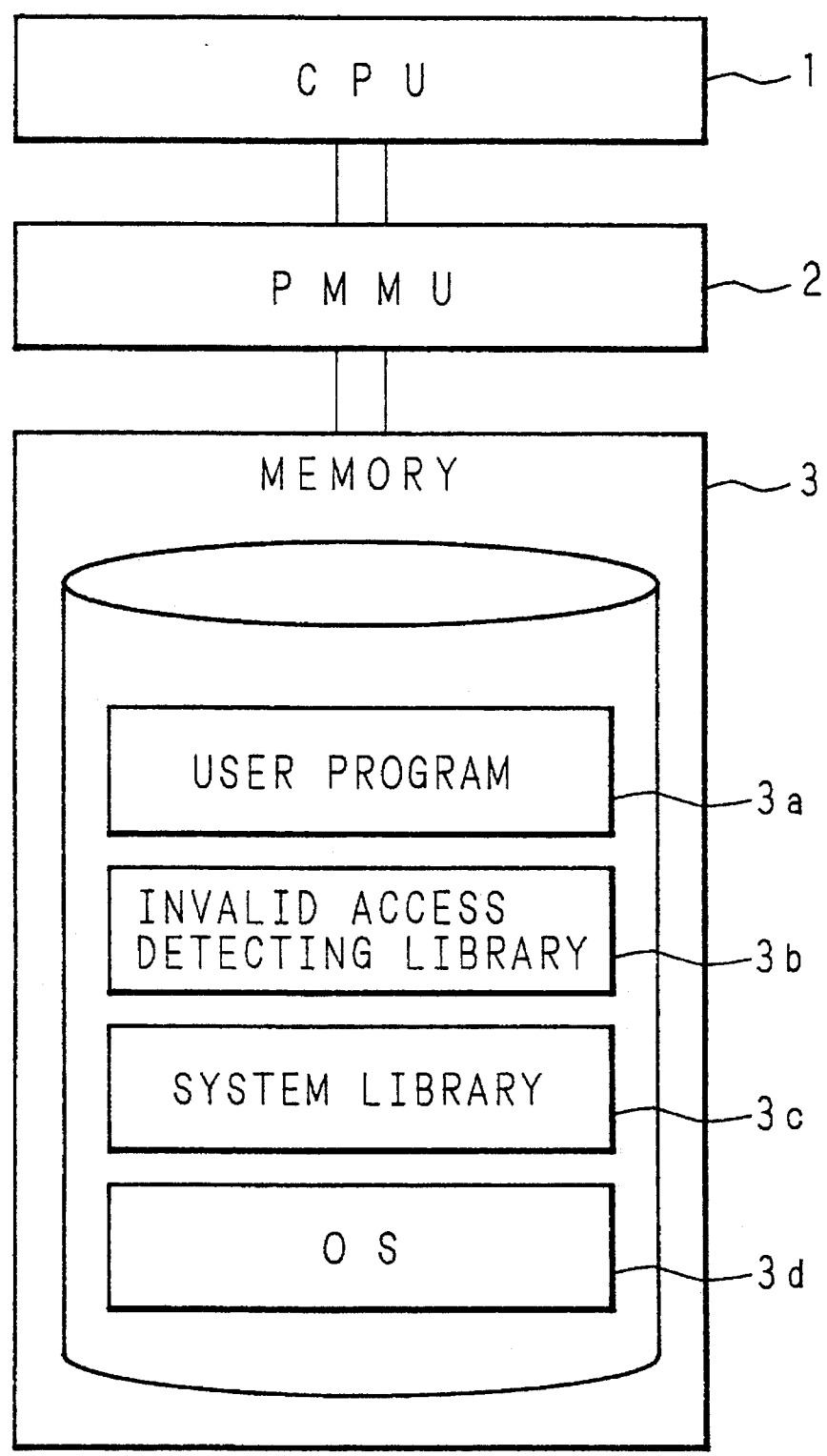
FIG. 6 is a diagram showing the configuration of a hardware used in a system of the invention.

Now, the present invention will be described in more detail referring to the drawings illustrating the embodiments thereof. FIG. 6 is a diagram showing the configuration of a hardware used for the system of the invention, and FIG. 7 is a flowchart of the outline of the process by the present system.

As is shown in FIG. 6, a memory 3 that is connected to the CPU 1 and the PMMU 2 is loaded with a user program 3a, an invalid access detecting library 3b according to the invention, a system library 3c and an operating system (OS) 3d. As described above, when such an executable file is created, the dynamic memory allocating and deallocating facilities in the system library 3c cannot be called by the user program 3a.

Figure 7:
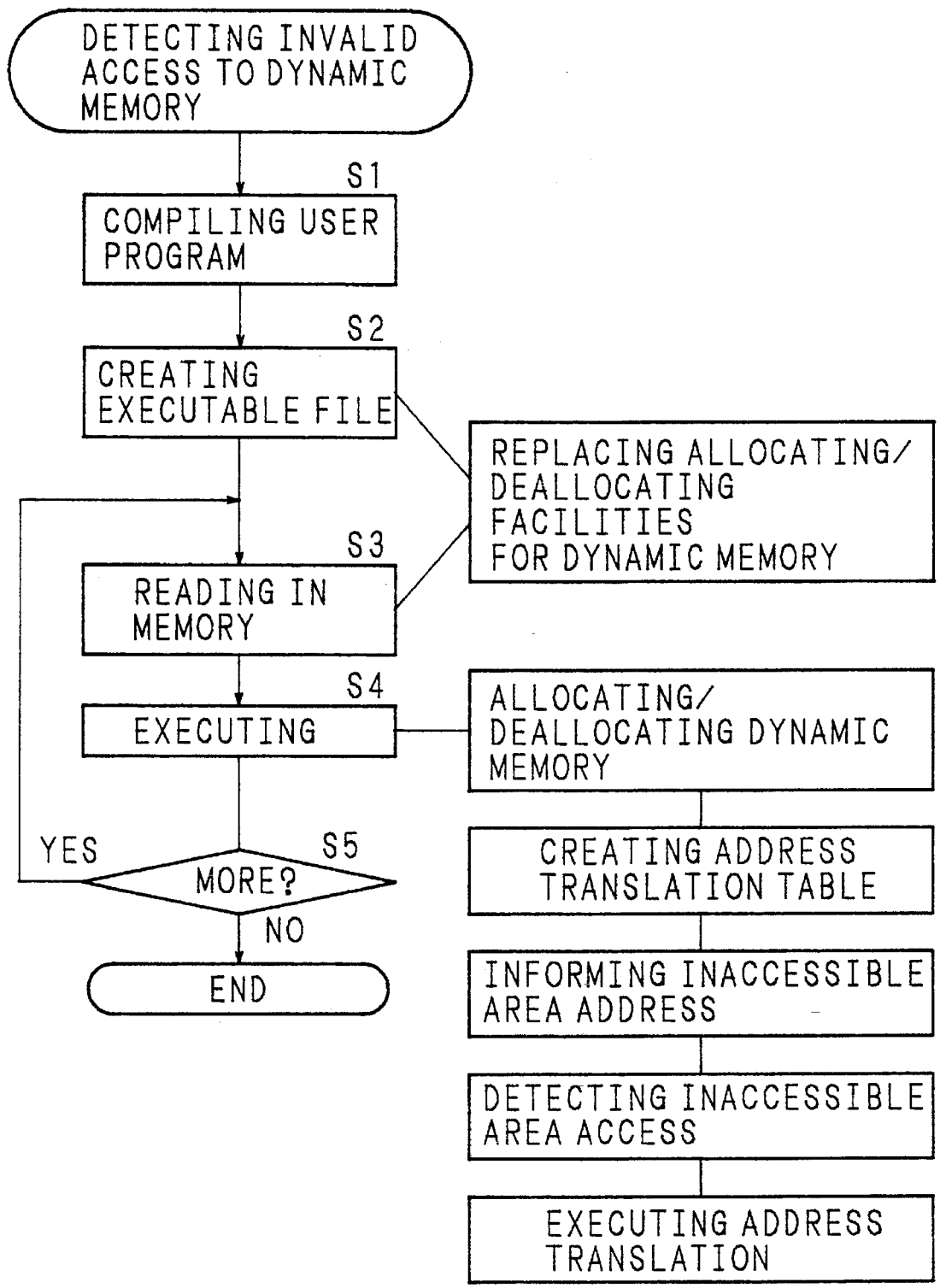
FIG. 7 is a general flowchart of a method of the invention.

As is shown in FIG. 7, the user program is first compiled in the present invention (S1). Then, the executable file is created (S2), and the created executable file is read in the memory 3 (S3). In these procedures, the allocating/deallocating facilities for a dynamic memory of the system library 3c are replaced with those of the invalid access detecting library 3b according to the invention, or alternatively, such facilities in the system library 3c are prohibited to be called. Next, the file is executed (S4 and S5). In this executing procedure, a dynamic memory is allocated, an address translation table is created, the address of an inaccessible area is informed, an access to the inaccessible area is detected, and the address is translated, as is described referring to FIGS. 2 and 4.

Each of the aforementioned facility realizing means will now be described in more detail.

Dynamic memory allocating/deallocating facility replacing means:

This means replaces the dynamic memory allocating/deallocating facilities provided by the system with the dynamic memory allocating facility/dynamic memory deallocating facility/dynamically allocated memory access checking facility according to the present invention. Through this replacement, the aforementioned facilities of the invention are activated in response to a request of the user program for allocating/deallocating a dynamic memory, thereby enabling an invalid access to a dynamically allocated memory to be detected. A method for replacing these facilities depends upon whether or not the OS has a library sharing function and whether or not the program uses a shared library. Furthermore, among the OSs having the library sharing function, the method depends upon whether or not the OS provides a function of dynamically specifying a pre-load library.

Figure 8:
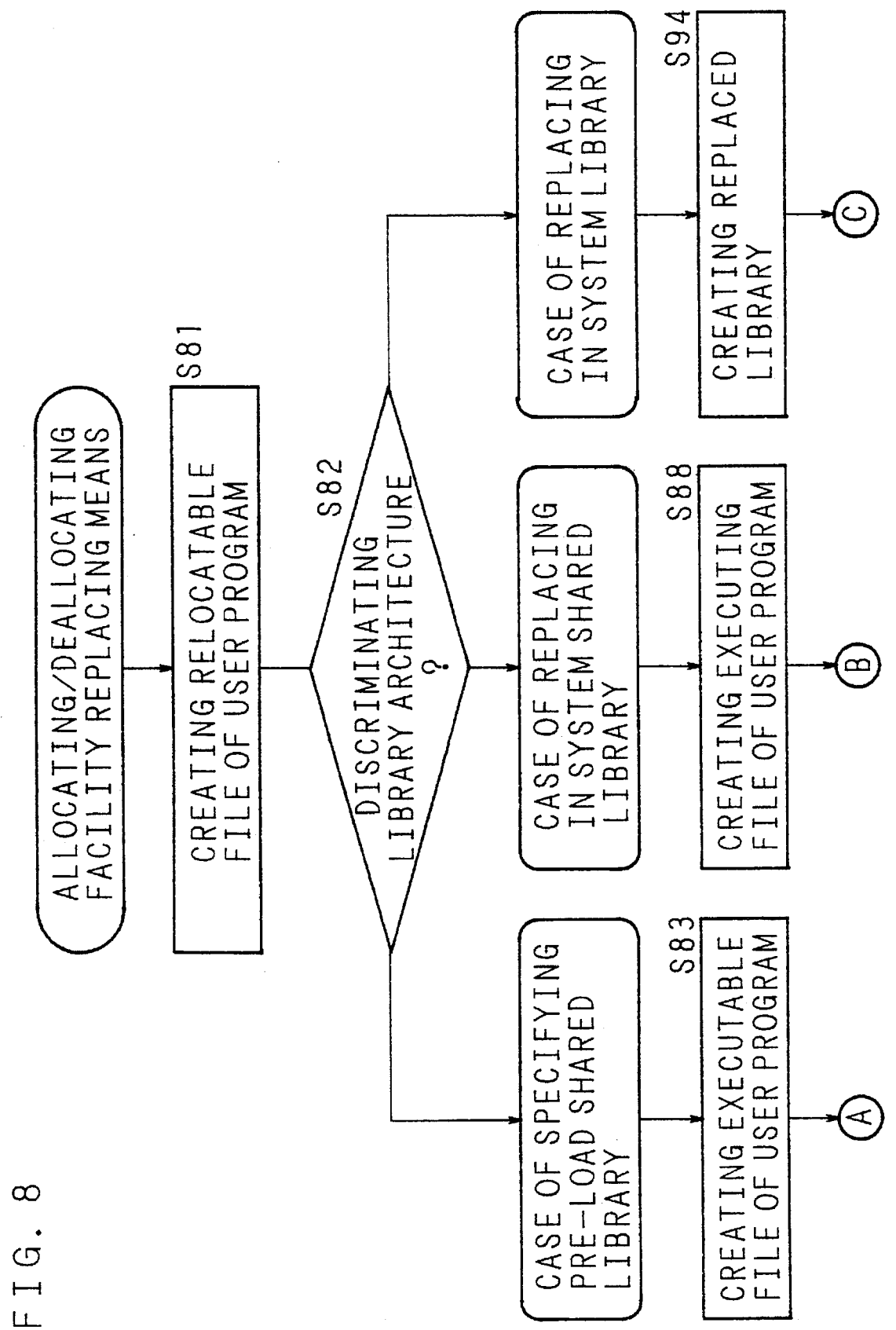
FIG. 8 is a flowchart for a replacing process of the invention.
Figure 9:
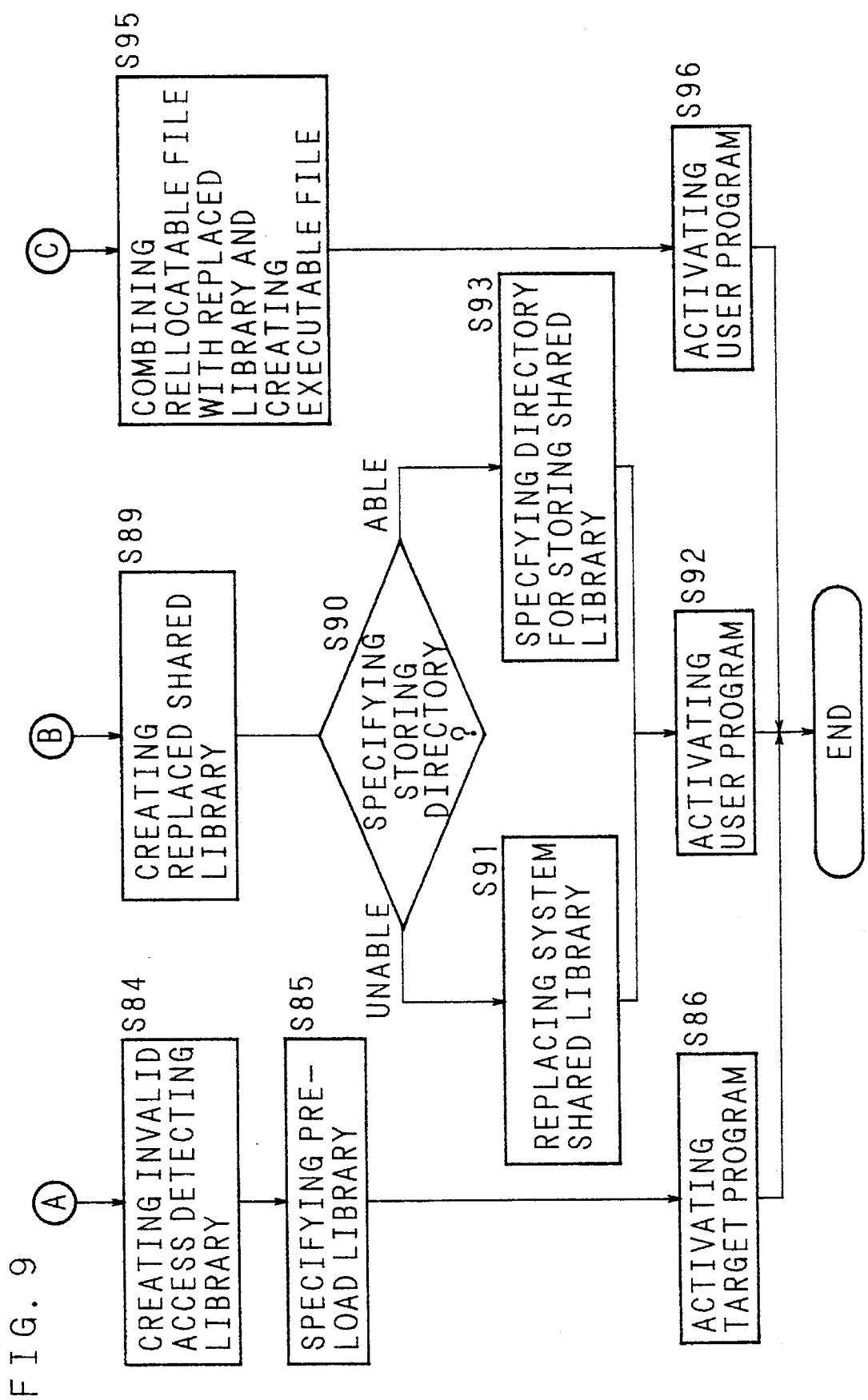
FIG. 9 is another flowchart for the replacing process of the invention.

FIGS. 8 and 9 are flowcharts for such replacing procedures depending upon the aforementioned environments. When the software for practicing the invention is produced as a general product, the software is constructed so as to determine the library architecture, thereby automatically performing replacement suitable for the architecture as is shown in FIGS. 8 and 9. When the software is constructed for a specified application system, it is sufficient that the software is constructed so as to perform replacement suitable for the library architecture of the system alone.

First, a relocatable file of the user program is created (S81). Next, the library architecture is discriminated (S82). When the OS has the function for specifying a pre-load shared library (i.e., when the OS has the library sharing function and can specify a pre-load library and the program uses a shared library), the procedure proceeds to S83, where an executable file of the user program is created.

An invalid access detecting library including the dynamic memory allocating facility/deallocating facility/dynamically allocated memory access checking facility is created (S84). In activating a target program (i.e., the user program to be debugged), the invalid access detecting library is specified as the pre-load library (S85).

Figure 10:
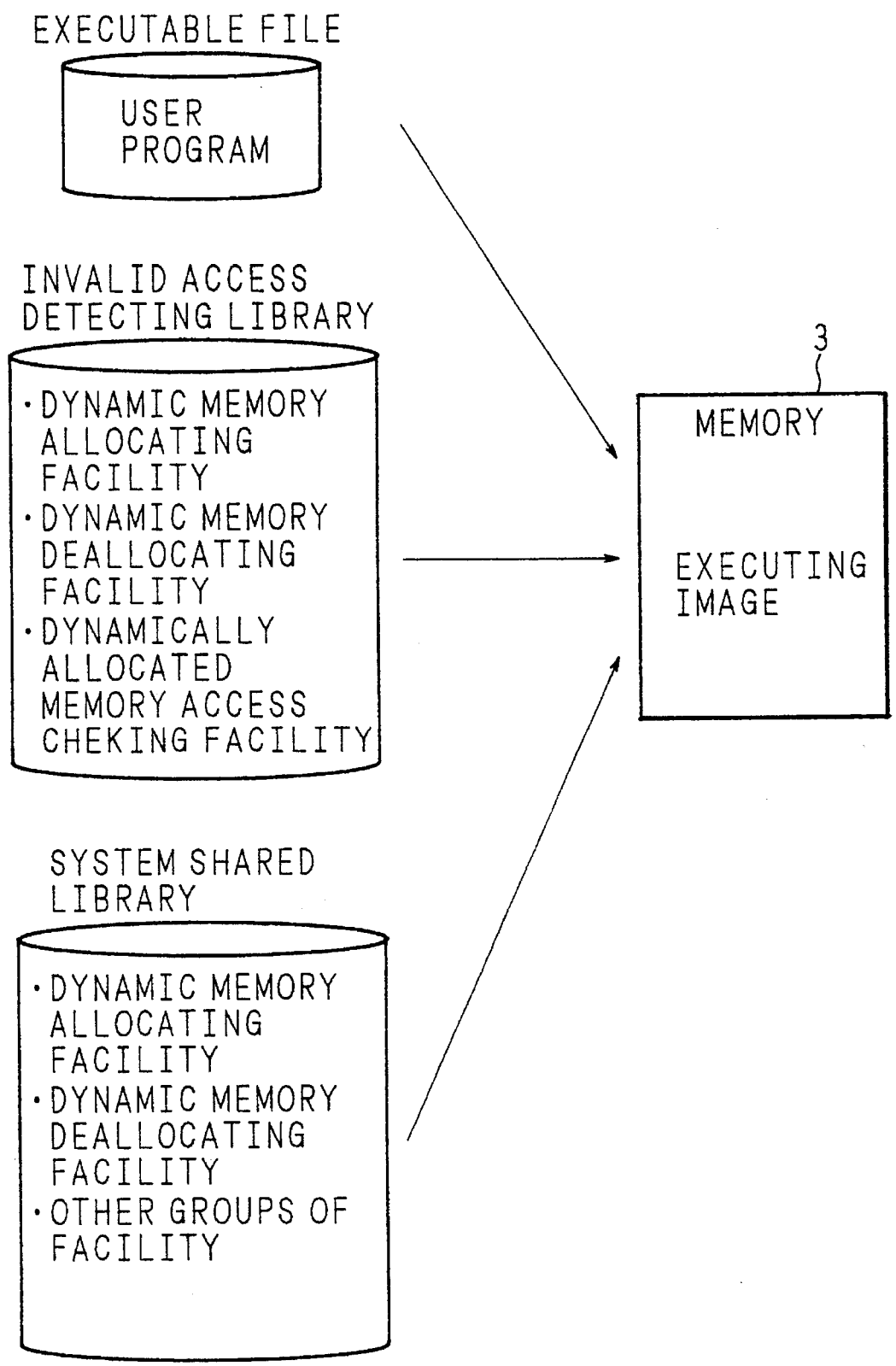
FIG. 10 is a diagram showing the structure of a file in the present invention.
Figure 11:
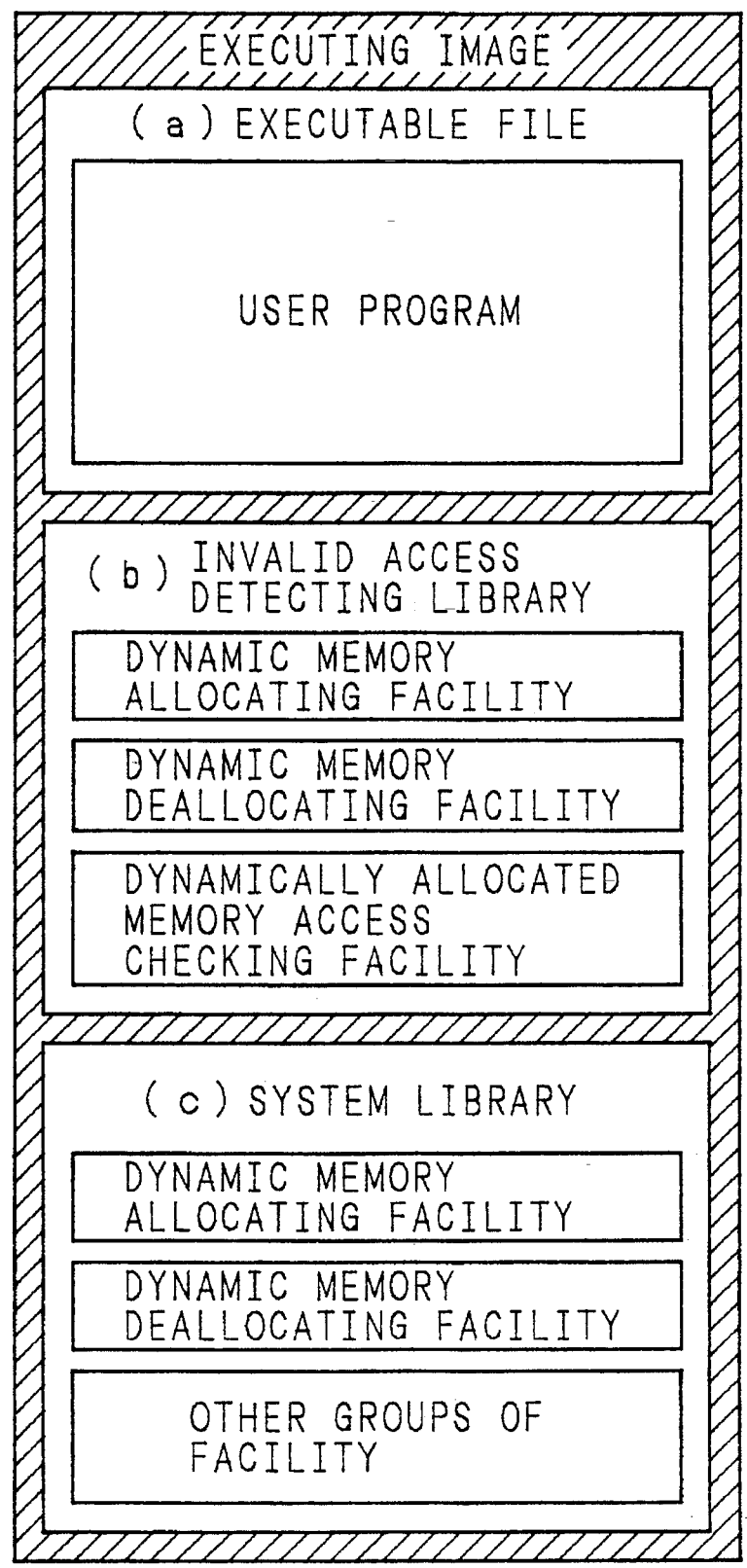
FIG. 11 is a mapping image diagram in a memory of the invention.

FIG. 10 illustrates the structure of the file used in this case, and FIG. 11 is a mapping image diagram in the memory 3.

When the target program is activated (S86), the executable file, the invalid access detecting library and the system library are read in the memory in this order, thereby creating an executing image. Although the dynamic memory allocating/deallocating facilities are remained in the system library, this causes no problem because the facilities in the invalid access detecting library are preloaded.

Next, the case of the replacement in a system shared library, namely, the case where the OS has the library sharing function but cannot specify a pre-load library and the target program uses a shared library, will be described.

Figure 12:
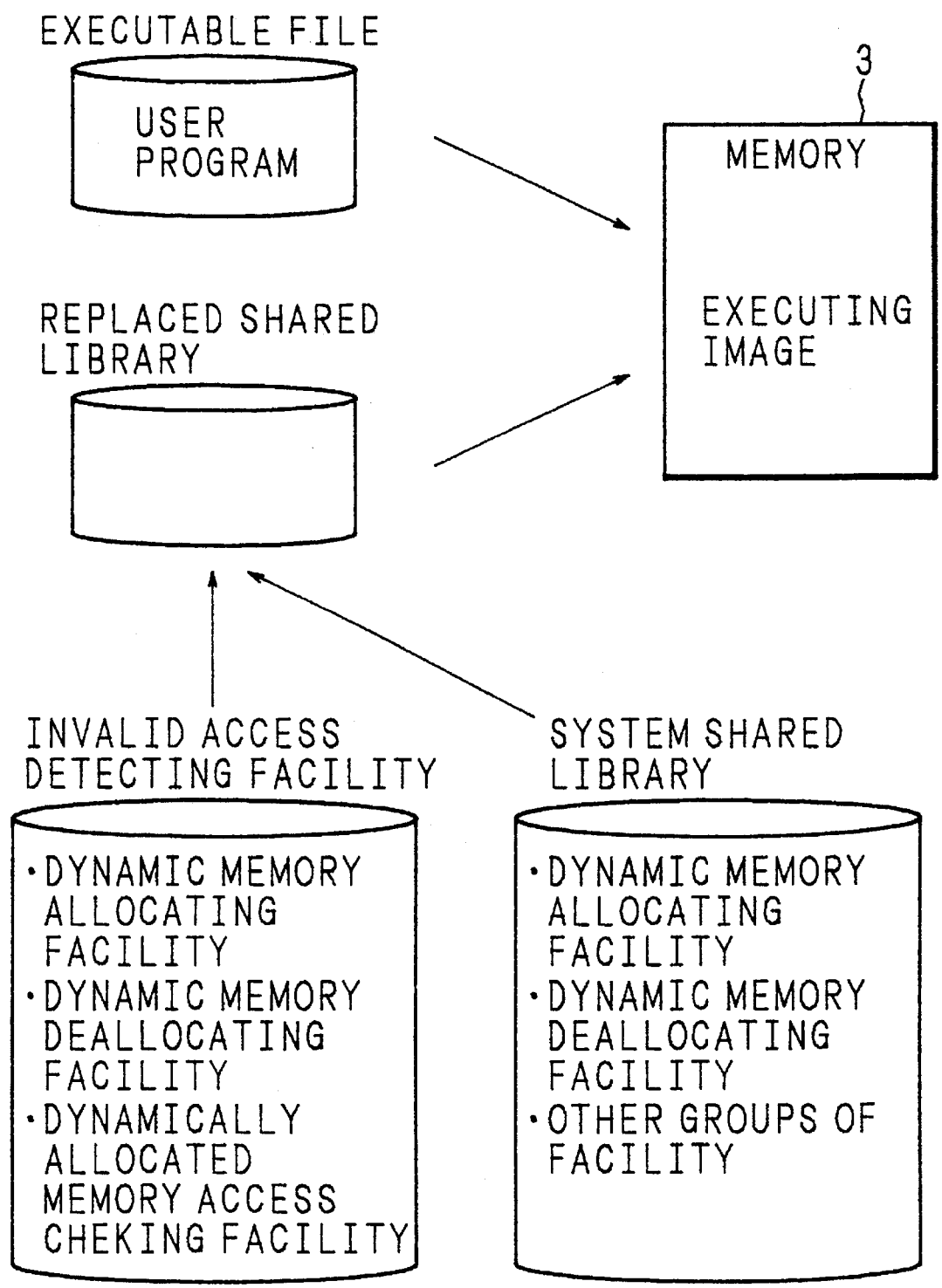
FIG. 12 is another diagram showing the structure of a file in the present invention.
Figure 13:
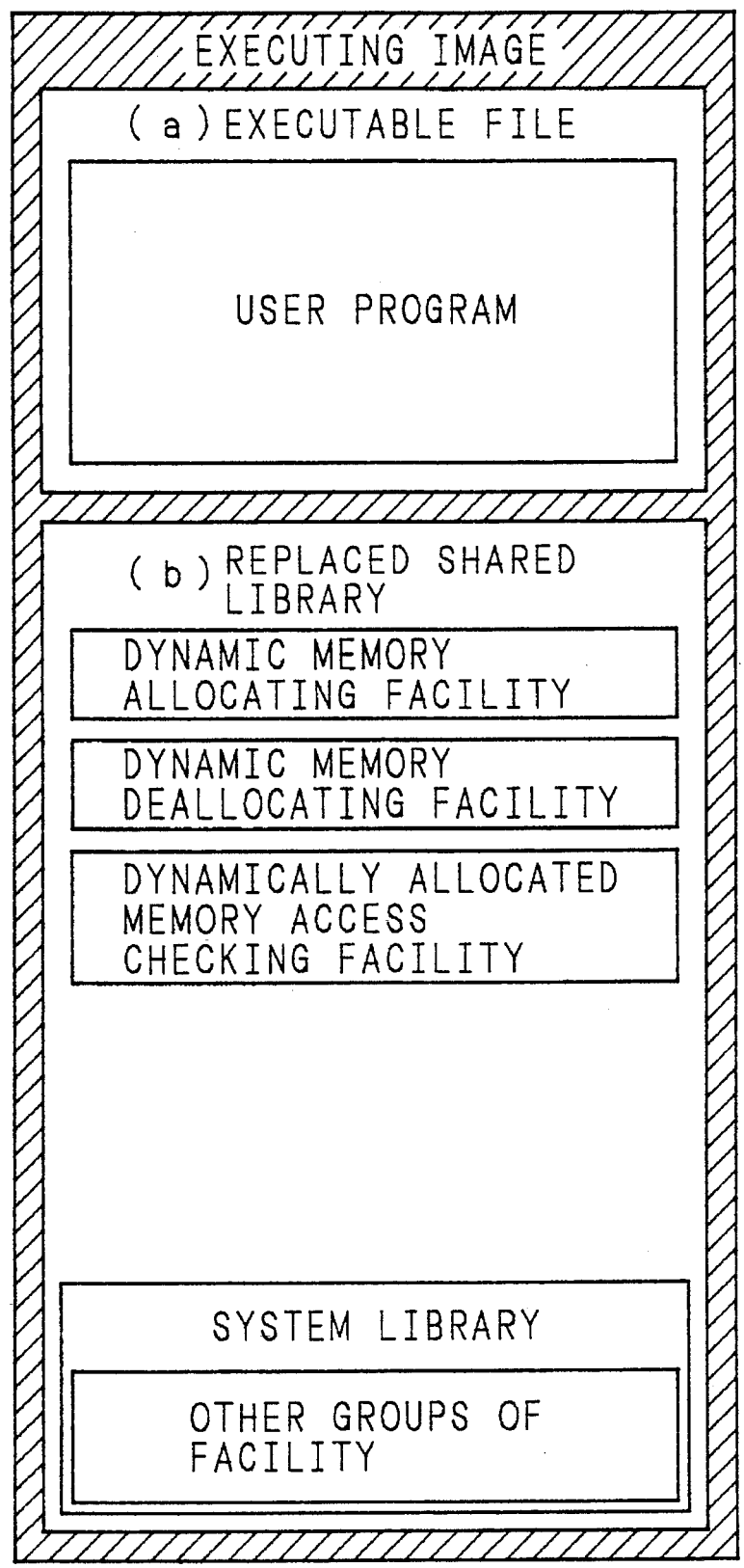
FIG. 13 is another mapping image diagram in a memory of the invention.

FIG. 12 illustrates the structure of the file used in this case, and FIG. 13 is a mapping image diagram in the memory 3.

In this case, an executing file of the user program is created in S88, and then, a library in which the dynamic memory allocating/deallocating facilities of the system library are replaced with the dynamic memory allocating facility/deallocating facility/dynamic memory access checking facility of the invention (hereinafter referred to as the replaced shared library) is created (S89).

When the target program is activated, in using the OS capable of specifying a directory for storing a shared library, the directory that stores the replaced shared library is specified as the directory for storing a shared library (S90 and S93). When the OS cannot specify the directory for storing a shared library, the system shared library is temporarily replaced with the replaced shared library (S91). When the target program is activated (S92), the executable file and the replaced shared library are read in the memory in this order, thereby creating an executing image.

In using the OS incapable of specifying the directory for storing a shared library, the system shared library is restored when the activation of the target program is finished.

Figure 14:
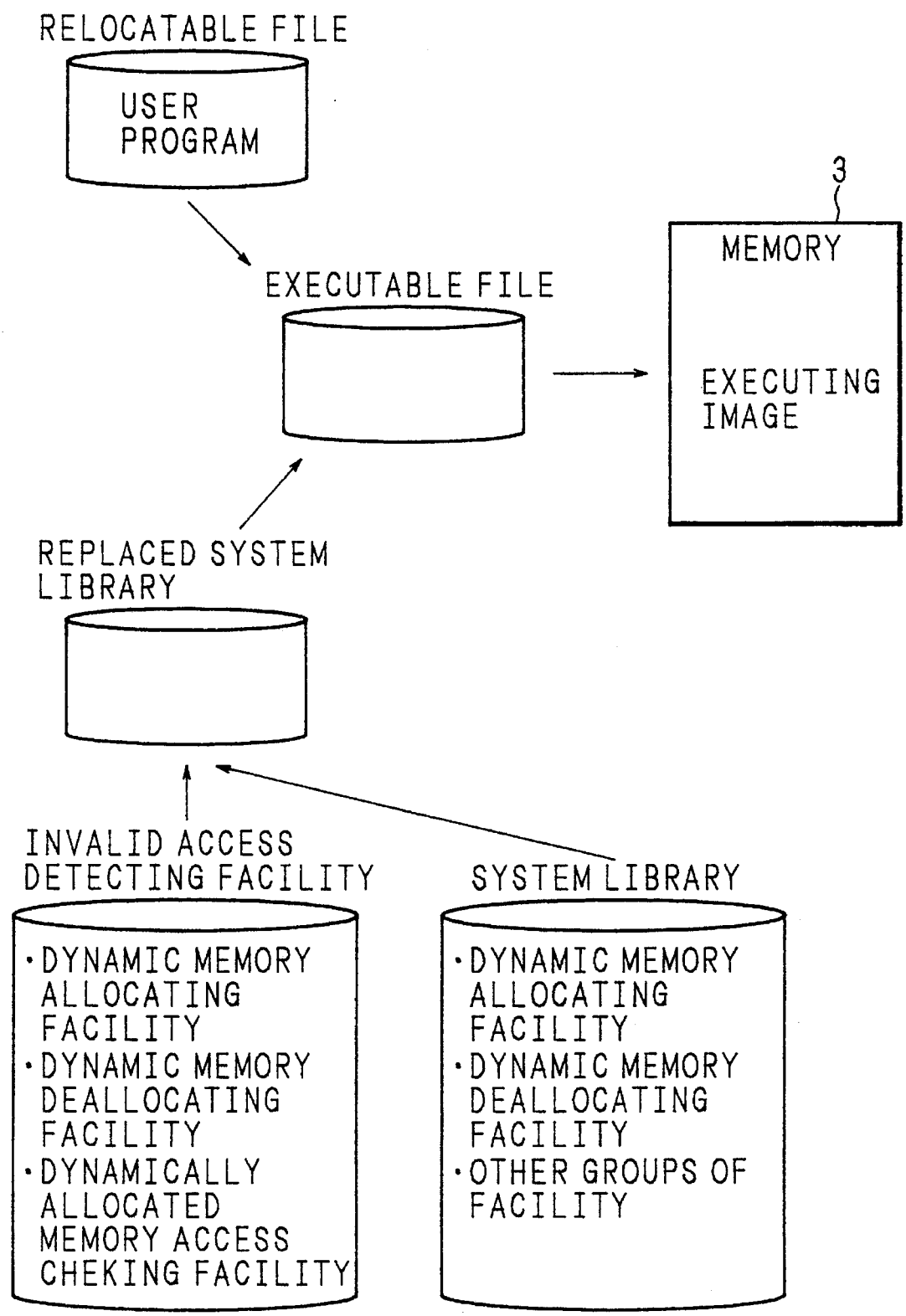
FIG. 14 is still another diagram showing the structure of a file in the invention.
Figure 15:
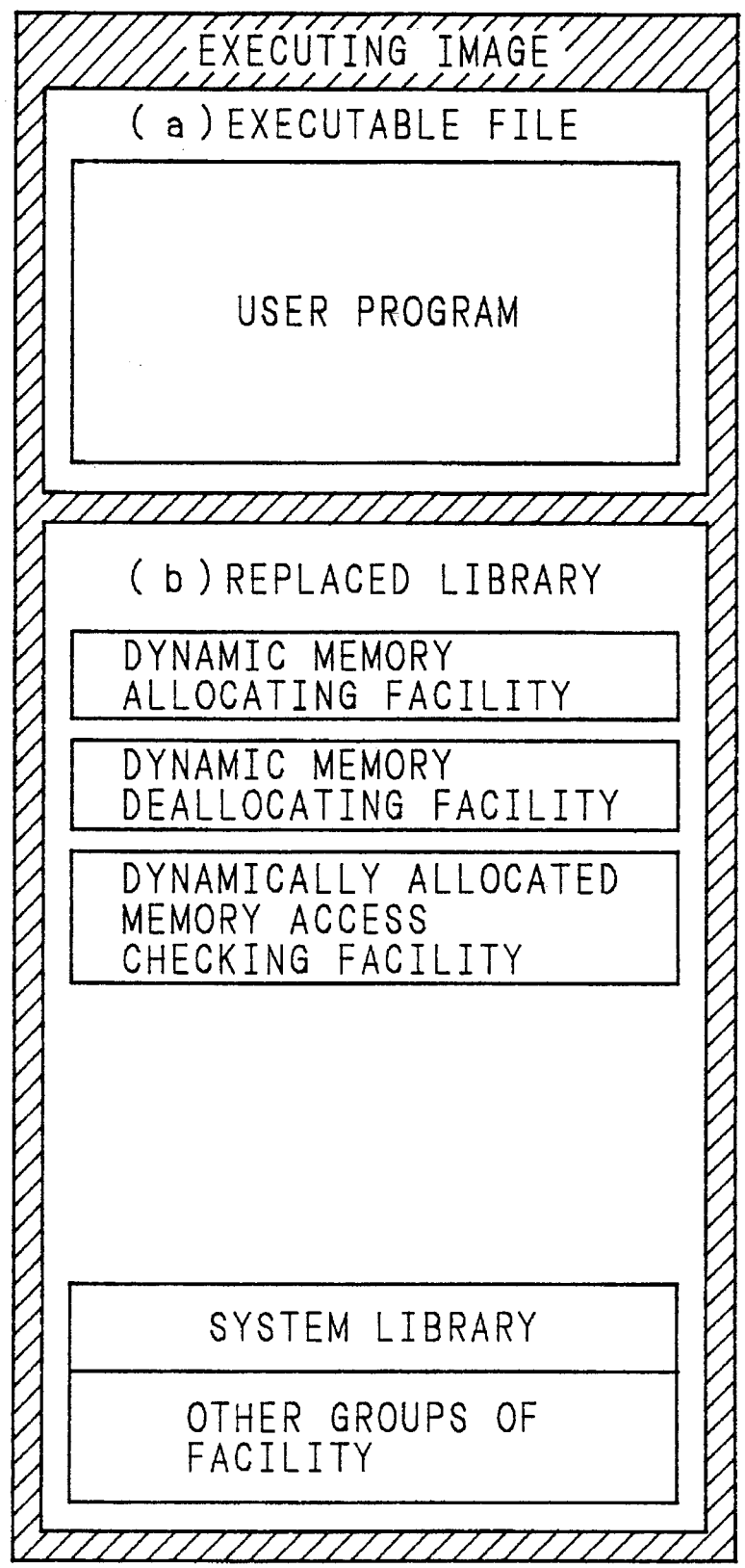
FIG. 15 is still another mapping image diagram in a memory of the invention.

The last case (i.e., the case of the replacement in the system library) will be described as follows:

FIG. 14 illustrates the structure of the file used in this case, and FIG. 15 is a mapping image diagram in the memory 3. In this case, a library in which the dynamic memory allocating/deallocating facilities of the system library are replaced with the dynamic memory allocating facility/deallocating facility/dynamically allocated memory access checking facility of the invention, i.e., the replaced library, is created (S94). In creating an executable file from a relocatable file, the replaced library is specified instead of the system library so as to be combined with the target program, thereby creating an executable file of the target program is created (S95). Then, the target program is activated (S96).

Through the aforementioned procedures, the dynamic memory allocating/deallocating facilities of the invention is activated instead of the dynamic memory allocating/deallocating facilities of the system, in response to the request of the user program for allocating/deallocating a dynamic memory.

Figure 16:
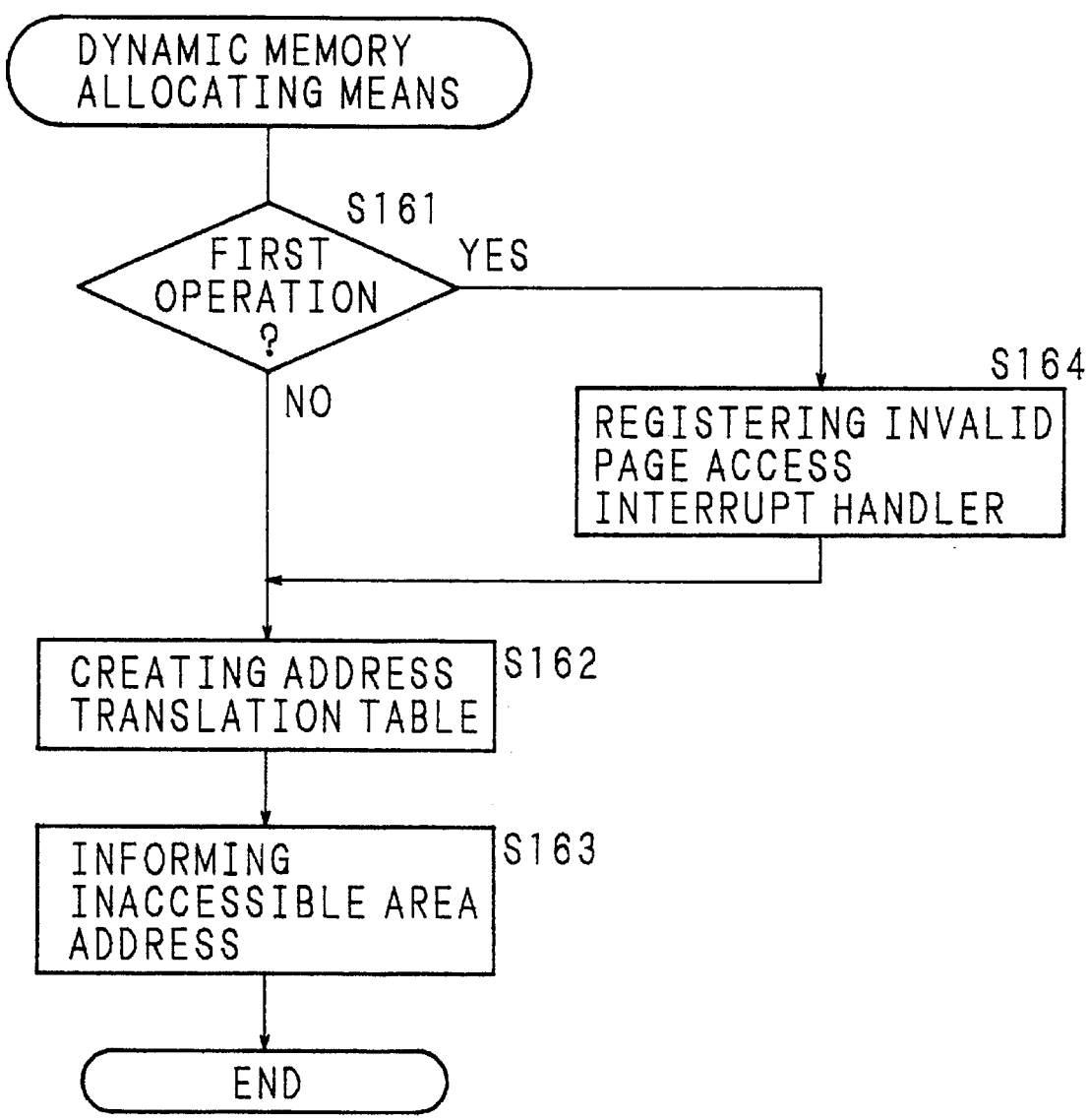
FIG. 16 is a flowchart for dynamic memory allocating means of the invention.

When the user program is activated for debugging or the like, the following means function:

Dynamic memory allocating means:

The processing procedures for this means are shown in FIG. 16. In response to a request of the user program for allocating a dynamic memory, this means allocates the dynamic memory by using address translation table creating means (S162) and inaccessible area address informing means (S163) described below. Furthermore, this means registers an invalid page access interrupt handler (S164) in the first operation (S161).

The invalid page access interrupt handler is registered as follows:

When an inaccessible page is accessed in executing the user program, the PMMU detects the access and generates hardware interrupt. When the hardware interrupt is generated, an interrupt handler that is previously registered in a hardware interrupt vector is called.

In the present invention, this mechanism of the PMMU is utilized to check the validity of an access to a dynamically allocated memory. For this purpose, the dynamically allocated memory access checking facility is registered in the hardware interrupt vector as the interrupt handler activated in response to the hardware interrupt generated by the PMMU when an access to an inaccessible page is detected (hereinafter referred to as the invalid page access interrupt handler).

When the OS provides a function for accepting the hardware interrupt generated by the PMMU, the invalid page access interrupt handler is registered not by directly operating the interrupt vector but in accordance with the procedure defined by the OS.

The dynamically allocated memory access checking facility is activated in the invalid page access interrupt handler by using the inaccessible area access detecting means and the address translation executing means.

Figure 17:
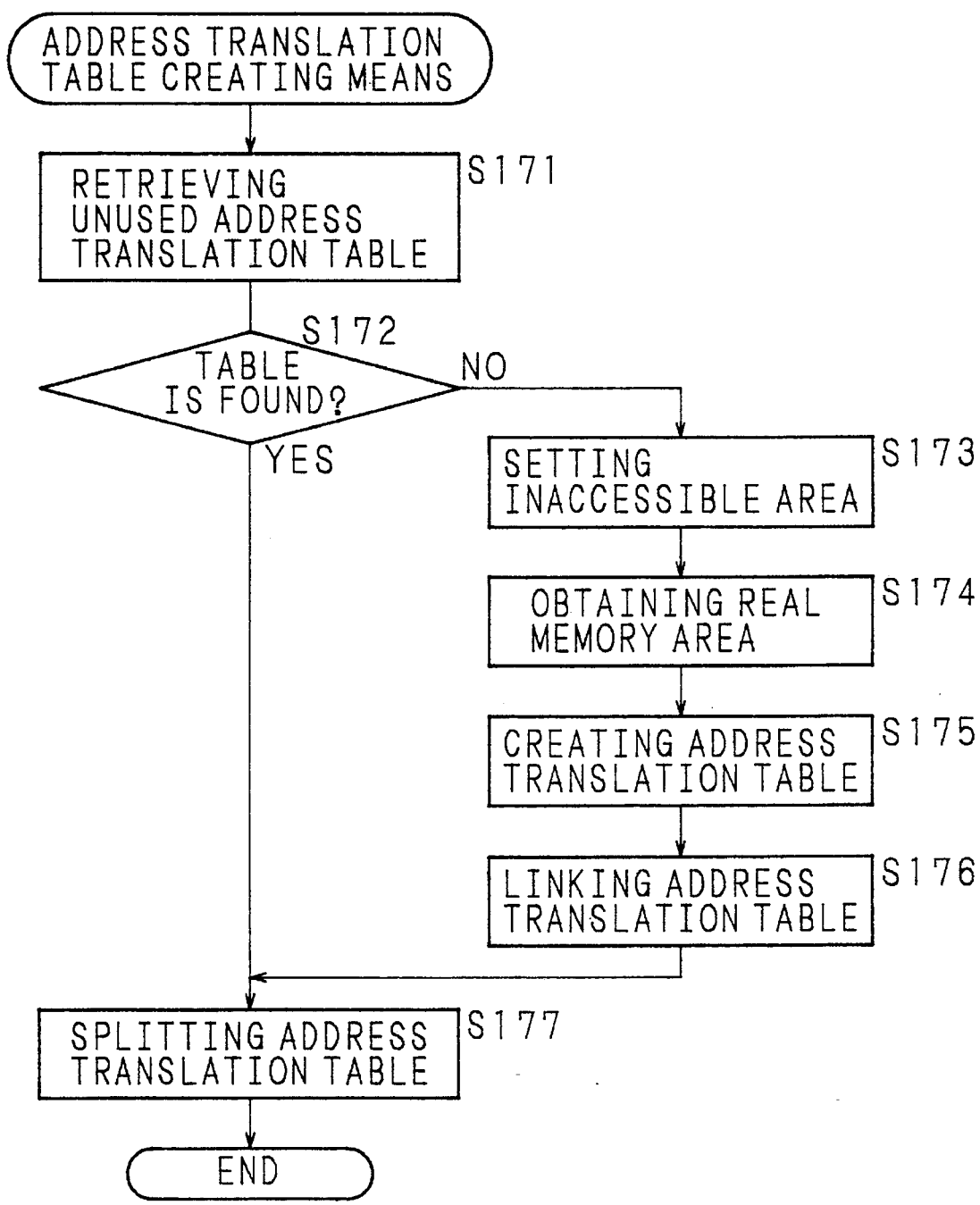
FIG. 17 is a flowchart for address translation table creating means of the invention.

Address translation table creating means (S162):

The processing procedures for this means are shown in FIG. 17. This means conducts the following process in response to the request for allocating a dynamic memory:

Retrieval of an unused address translation table (S171):

A requested allocation size from the user program is added to a double gap size, and the resultant sum is raised to a minimum allocation unit. The obtained result is defined as a necessary allocation size. Then, the address translation tables connected to a retrieval control link described below are retrieved for an address translation table for managing an unused area whose size satisfies the necessary allocation size.

When a satisfactory address translation table is found as a result of the retrieve (S172), the address translation table is split (S177). When no address translation table is found, an inaccessible area is set (S173), a real memory area is obtained (S174), an address translation table is created (S175), and the address translation table is linked to the retrieval control link (S176), successively. Then, the address translation table is split (S177).

Set of an inaccessible area (S173):

The necessary allocation size is raised to a multiple of the page size. Then, the page management table used for controlling the PMMU is retrieved for connected unused pages satisfying the raised size. The unused pages found through the retrieve are made busy with all the access rights prohibited.

When the OS provides an equivalent processing function with regard to the control of the PMMU and the operation of the page management table, the page management table is not directly operated but the process provided by the OS is called.

Obtainment of a real memory area (S174):

Connected unused pages having the same size as that of the inaccessible area set in the procedure of the set of an inaccessible area (S173) is retrieved by the page management table used for controlling the PMMU. The unused pages found as a result of the retrieve are made busy with the write right and the read right enable, and a real memory page is allocated.

When the OS provides an equivalent processing function with regard to the control of the PMMU and the operation of the page management table, the page management table is not directly operated but the process provided by the OS is called.

Figure 18:
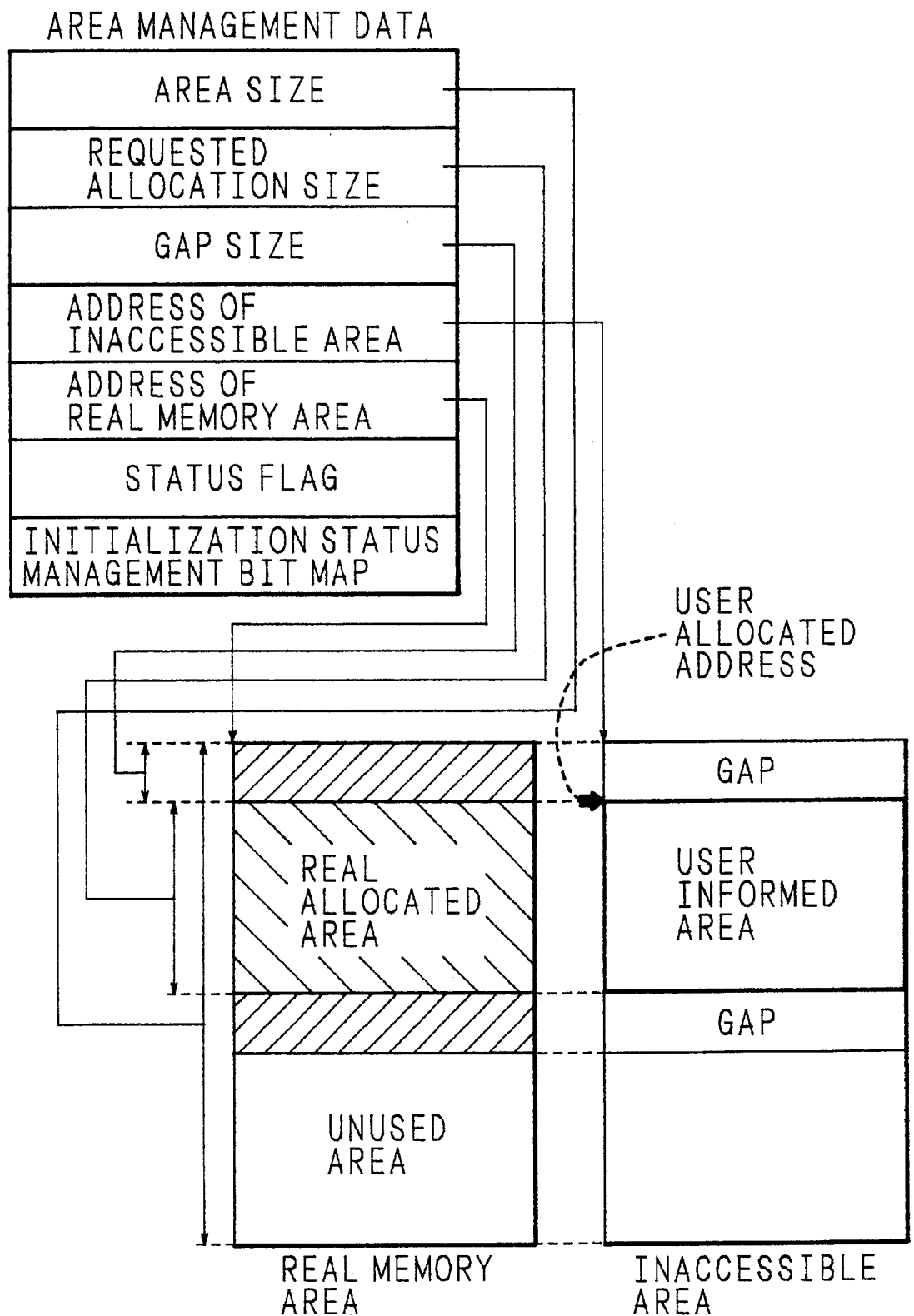
FIG. 18 is diagram illustrating an area management data of the invention.

Creation of an address translation table (S175):

An address translation table includes area management data shown in FIG. 18 and retrieve control data (not shown). FIG. 18 shows the relationship between the area management data and the inaccessible area or the real memory area. The area management data includes the following items:

Area size:

An area size means the size of the entire area managed by or subject to the address translation table. Therefore, the size of the inaccessible area set in the procedure of the set of an inaccessible area (S173) and the size of the real memory area obtained in the procedure of the obtainment of a real memory area (S174) are set as this item.

Requested allocation size:

A requested allocation size means the size of an area allocated in response to a request of the user program, in the area managed by the address translation table. Therefore, the size of the area allocated in response to the request of the user program is set as this item.

Gap size:

A gap size means the size of a gap for preventing dynamically allocated areas from being connected to each other. When the dynamically allocated areas are connected adjacent to each other, an access beyond the range made by the user program cannot be distinguished from an access to the adjacent area, and hence, the allocated areas should not be continuously positioned. When the gap size is fixed, this item is not required.

Address of an inaccessible area:

The address of an inaccessible area means the leading address of each inaccessible area managed by the address translation table. The leading address of the inaccessible area set in the procedure of the set of an inaccessible area (S173) is set as this item.

Address of a real memory area:

The address of a real memory area means the leading address of each real memory area managed by or subject to the address translation table. The leading address of the real memory area obtained in the procedure of the obtainment of a real memory area (S174) is set as this item.

Status flag:

A status flag means the usage status of each area managed by the address translation table. Two kinds of statuses, "used" and "unused", as well as an additional status in accordance with the need of a person who practices the invention can be set as this item. In obtaining an area, a value corresponding to the status "used" is set for the area.

Initialization status management bit map:

An initialization status management bit map means the initialization status of each byte in the area managed by the address translation table. Each bit in this bit map indicates the initialization status of each byte of the area. The initialization status can be either an uninitialized status or an initialized status. The uninitialized status means that a data has never been written in the byte. The initialized status means that a data has been written in the byte once or a larger number of times. In obtaining an area, all the bytes in the area are set to be in "the uninitialized status".

With regard to the aforementioned items, a person who practices the invention can append another item, reorganize them, omit any of them, integrate any of them and subdivide any of them.

The retrieve control data is an additional data for forming a retrieval control link. The retrieval control link is formed in order to retrieve the area management data at a high speed. The retrieval control link can be formed in various known modes such as a binary tree mode and a serial link mode. The structure of the retrieval control link can be defined by a person who practices the invention.

Now, the format of the address translation table will be described in the respective cases where the retrieval control link is formed in the binary tree mode and in the serial link mode.

Figure 19:
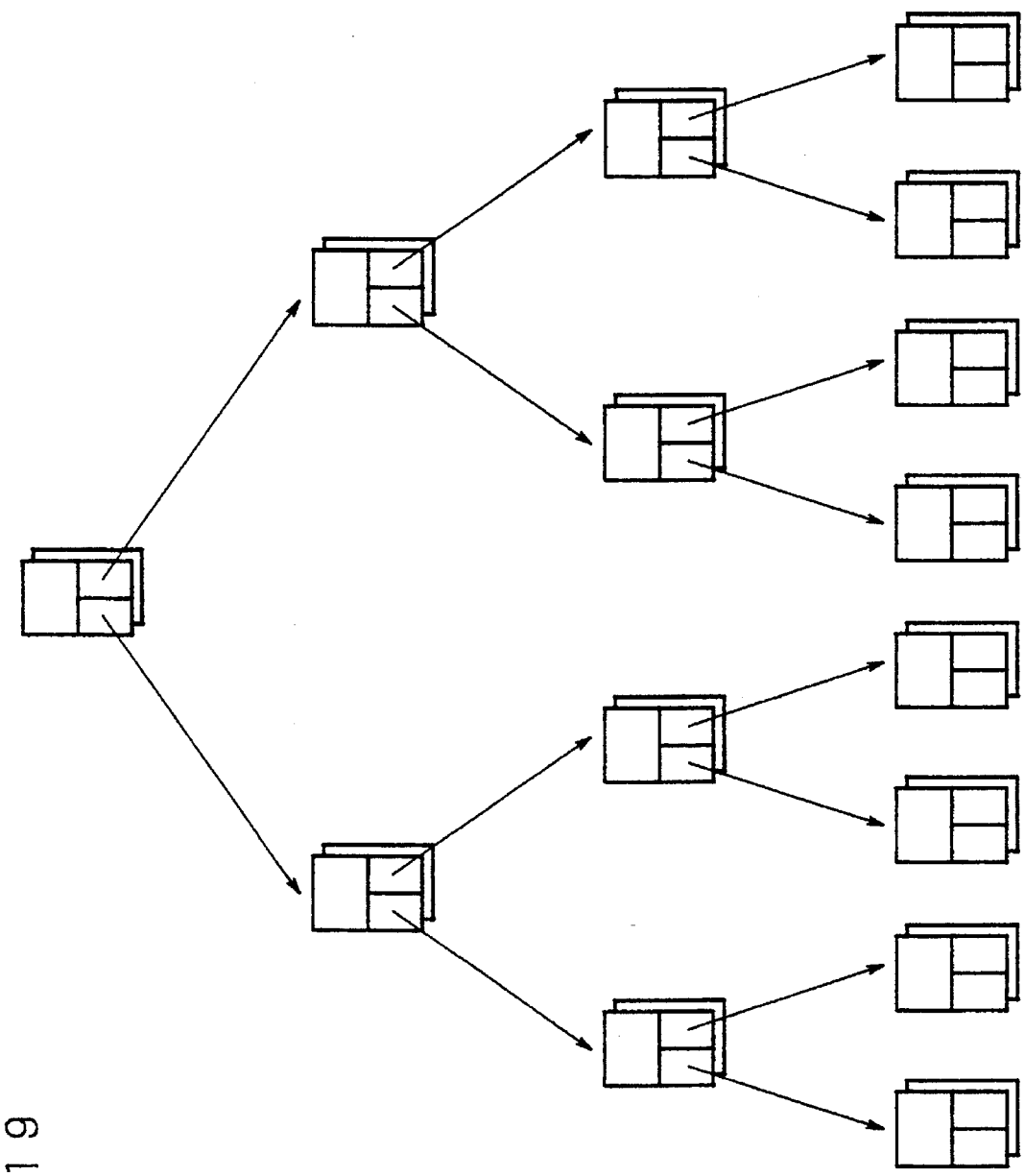
FIG. 19 is a schematic diagram of a retrieval control link in a binary tree mode of the invention.
Figure 20:
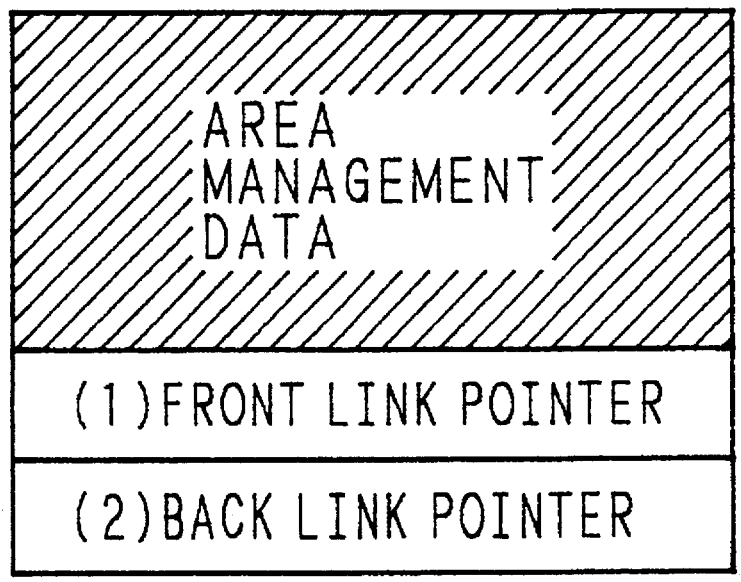
FIG. 20 is a schematic diagram of an address translation table of the invention used in the retrieval control link of FIG. 19.

Binary tree mode:

The outline of the retrieval control link of the binary tree mode is shown in FIG. 19, and the format of the address translation table in this case is shown in FIG. 20. The retrieve control data in the address translation table includes a front link pointer (1) and a back link pointer (2).

The front link pointer indicates an address translation table managing an inaccessible area positioned in front (for example, on the left side in FIG. 19) of the inaccessible area managed by its node. The back link pointer indicates an address translation table managing an inaccessible area positioned behind (for example, on the right side in FIG. 19) of the inaccessible area managed by its node. In forming the link, for the convenience in the retrieve, the addresses of the inaccessible areas managed by the respective address translation tables always have to form a tree.

Figure 21:
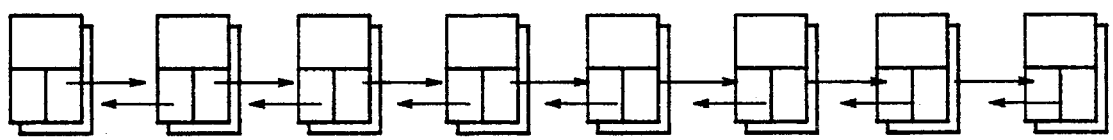
FIG. 21 is a schematic diagram of a retrieval control link in a serial link mode of the invention.
Figure 22:
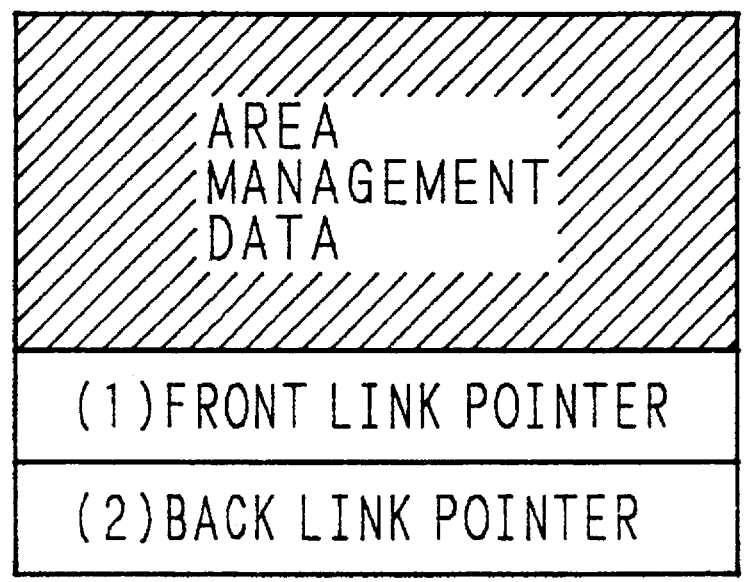
FIG. 22 is a schematic diagram of an address translation table of the invention used in the retrieval control link of FIG. 21.

Serial link mode:

The outline of the retrieval control link of the serial link mode is shown in FIG. 21, and the format of the address translation table in this case is shown in FIG. 22.

The retrieve control data in the address translation table includes a front link pointer (1) and a back link pointer (2).

The front link pointer indicates an address translation table managing an inaccessible area positioned in front of the inaccessible area managed by its node. The back link pointer indicates an address translation table managing an inaccessible area positioned behind of the inaccessible area managed by its node. In forming the link, the respective address translation tables always have to be sorted by the addresses of the inaccessible areas managed by the address translation tables.

The retrieval control link can be formed in either of the aforementioned modes, but when an address translation table is retrieved for an address included therein, the binary tree mode is superior.

In the case where the entire address translation tables are required to be operated, for example, when an unused address translation table is required to be retrieved for, or in the case where the previous and subsequent address translation tables are required to be accessed, for example, when the address translation tables are to be combined, the serial link mode is superior. Accordingly, both the modes are preferably used together.

As is shown in FIG. 17, such a linkage of the address translation tables (S176) is performed by linking the address translation table created in the procedure of the creation of an address translation table (S175) to the retrieval control link.

Address split (S177):

After the above-mentioned procedure, the address translation table is split (S177).

When an area managed by the address translation table retrieved in the procedure of the retrieve of an unused address translation table (S171) or the address translation table created in the procedure of the creation of an address translation table (S175) has a size larger than the sum of the necessary allocation size and a specified split criterion size, the inaccessible area and the real memory area are respectively split. The specified split criterion size can be defined by a person who practices the invention or by a user. The split is performed by the following procedures:

(1) Creation of an address translation table:

An address translation table (a new address translation table) is created for managing an area positioned in the back half of the area to be split. An area positioned in the front half of the area to be split is managed by an address translation table managing the area before splitting (an original address translation table). The items in the created new address translation table are set as follows:

Area size:

As the area size, (the size of the area managed by the original translation table—the necessary allocation size) is set.

Requested allocation size:

As the requested allocation size, 0 is set.

Gap size:

As the gap size, that in the original address translation table is set.

Address of the inaccessible area:

As the address of the inaccessible area, (the address of an inaccessible area in the original address translation table+the necessary allocation size) is set.

Address of the real memory area:

As the address of the real memory area, (the address of the real memory area in the original address translation table+ the necessary allocation size) is set.

Status flag:

The "unused status" is set as the status flag.

Initialization status management bit map:

All the bytes are set in the "uninitialized status".

(2) Linkage of the new address translation table:

The address translation table created in the procedure of the creation of an address translation table (S175) is linked to the retrieval control link in the same manner as in the procedure of the linkage of an address translation table (S176).

(3) Reset of the original address translation table:

The items in the address translation table managing the area before splitting are updated as follows:

Area size:

The necessary allocation size is set as an area size.

The other items:

No change is made in the other items.

Now, referring to FIG. 16 again, the inaccessible area address informing means (S163) will be described.

In response to a request for allocating a dynamic memory, the user program is informed of an address obtained by adding the address of the inaccessible area in the address translation table created in the procedure of the creation of an address translation table (S162) to the gap size in the address translation table (hereinafter referred to as the user allocated address).

As a result, the user program interprets the informed user allocated address as the address of the dynamically allocated memory.

Furthermore, the user allocated address is in the inaccessible area. Therefore, when the user program accesses to the user allocated address, the PMMU 2 detects it as an access to an inaccessible address, thereby activating the interrupt handler.

As described above, by utilizing this behavior of the PMMU, the accessing point to the dynamically allocated memory can be detected.

Figure 23:
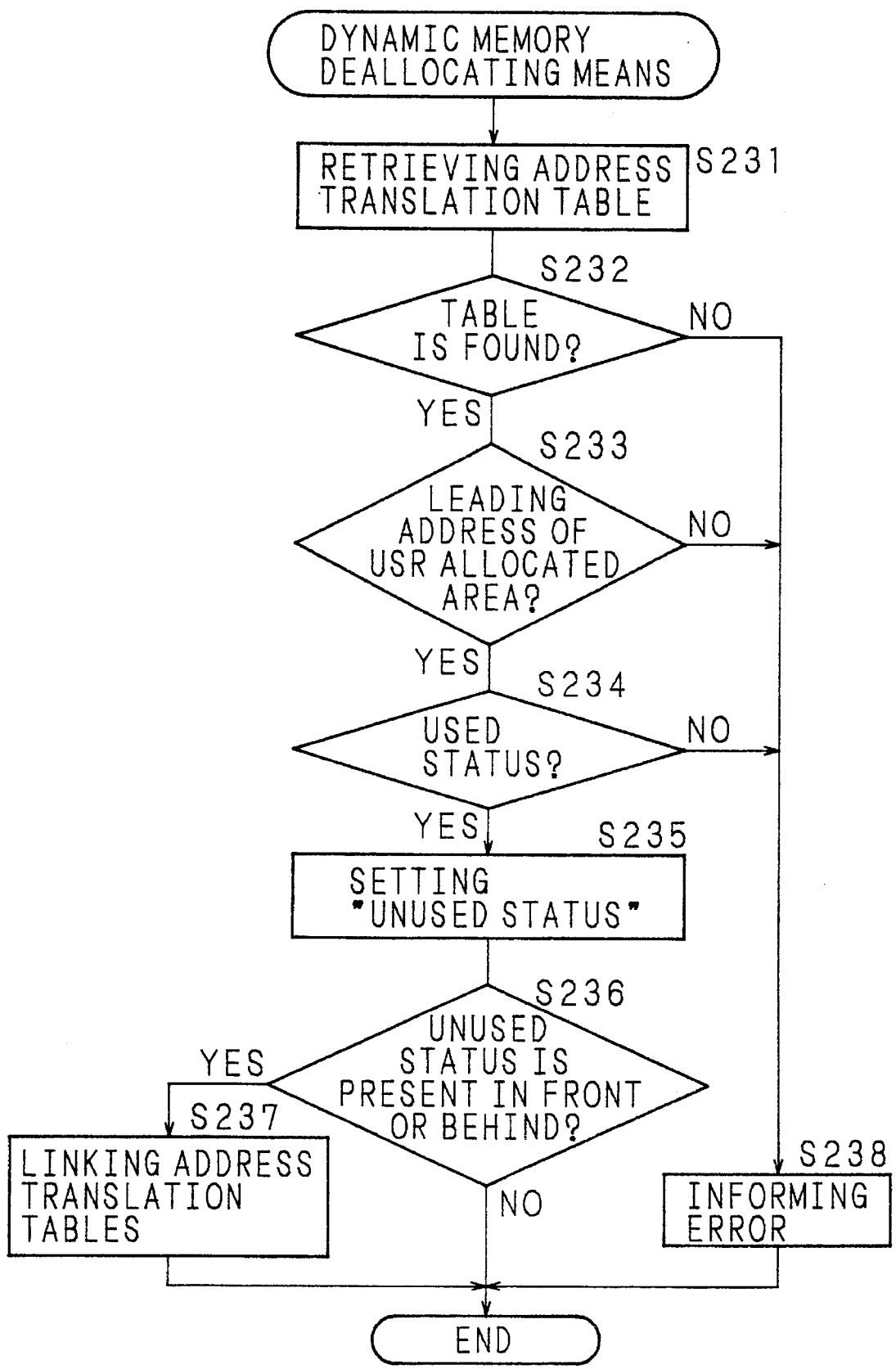
FIG. 23 is a flowchart for dynamic memory deallocating means of the invention.

Dynamic memory deallocating means:

FIG. 23 is a flowchart for the processing procedures of the dynamic memory deallocating means. This means performs the following process in response to a request for deallocating a dynamic memory:

Retrieval of an address translation table (S231):

An address translation table managing the area including the address designated by the request for deallocation is retrieved for in the retrieval control link.

When the corresponding address translation table is not found through the retrieve (S232), the user is warned of the fail of the retrieve, and the request for the deallocation is dismissed (error informing; S238).

When an address obtained by adding the address of the inaccessible area in the address translation table found through the retrieve to the gap size is not equal to the address designated by the request for the deallocation (i.e., when the found address is not the leading address of the user informing area) (S233), the address is different from the address informed the user program by the inaccessible area address informing means. Therefore, a warning is generated for the user, and the request for the deallocation is dismissed (error informing; S238).

When the status flag in the address translation table found through the retrieve is not in the "used" status (S234), this means that an access is made to an area that has never been allocated or that has already been deallocated. Therefore, a warning is generated for the user, and the request for the deallocation is dismissed (error informing; S238).

When both the procedures in S233 and S234 are determined to be YES, the status flag in the retrieved address translation table is set to be in the "unused status" (S235), thereby making the corresponding memory area an unused area.

When an address translation table in the unused status is present in front of or behind of the address translation table that has been placed in the unused status as above (S236), these address translation tables are linked with each other (S237) so as to manage the resultant area with merely one address translation table. The address translation table unwanted as a result of the linkage is deleted.

Figure 24:
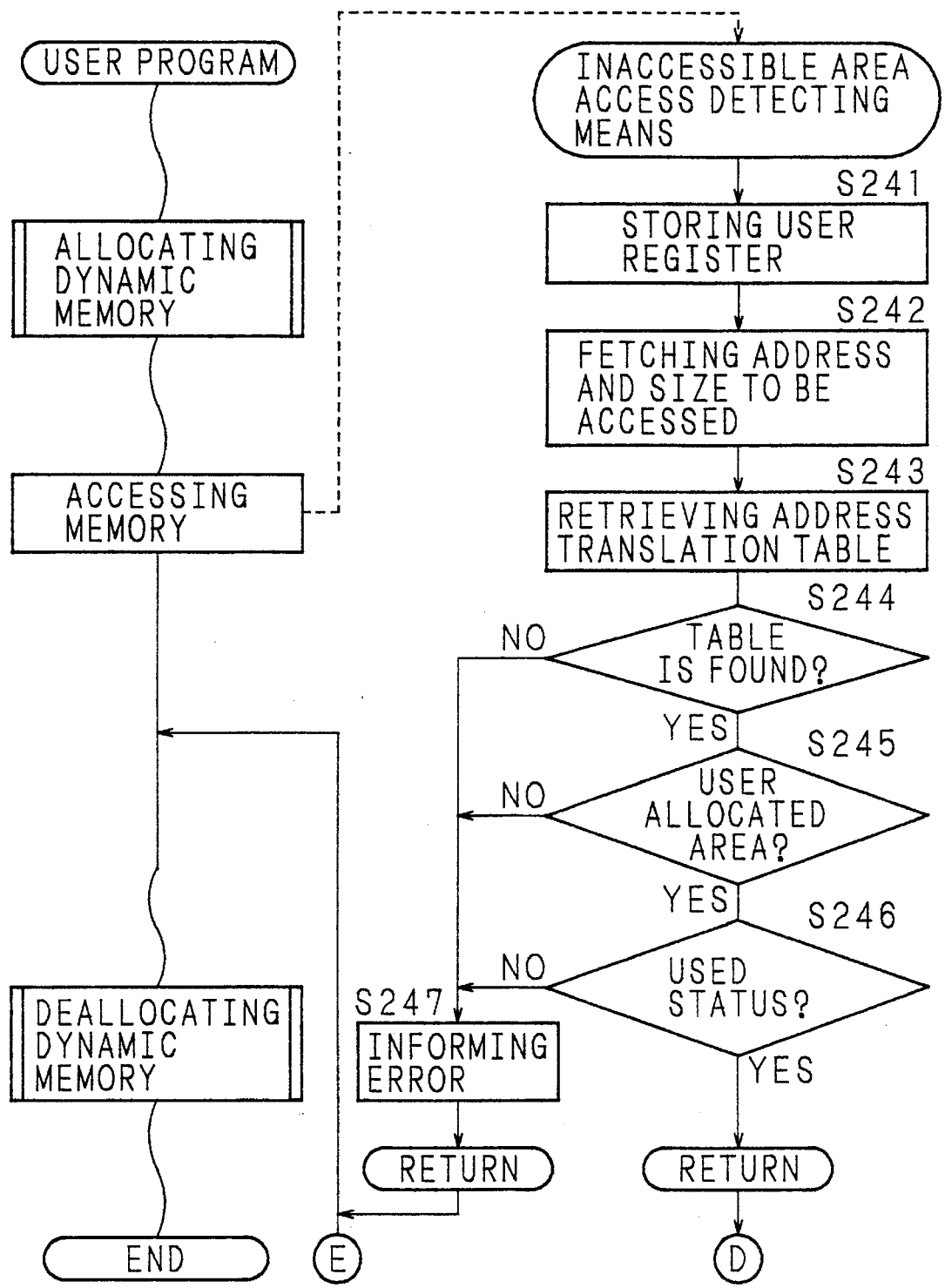
FIG. 24 is a flowchart for inaccessible area access detecting means of the invention.

Inaccessible area access detecting means:

FIG. 24 is a flowchart for the processing procedures of the inaccessible area access detecting means. This means is used in the invalid page access interrupt handler that is activated when the user program actually accesses to an inaccessible address informed the user program by the inaccessible area address informing means.

When an access to an inaccessible area is detected, the register used by the user program (hereinafter referred to as the user register) is stored (S241). This procedure is not required when the user register is stored in calling the interrupt handler by the OS. Then, the address and the size of the area to be accessed are fetched from the instruction to be executed (S242), and an address translation table managing the area including the fetched address (S243) is retrieved by the retrieval control link.

When the corresponding address translation table is not found through the retrieve (S244), a warning is generated for the user, and the access instruction is skipped (error informing; S247).

When the address translation table is found in the procedure of S244, it is determined whether or not the area to be accessed is a user informing area (S245). Specifically, when the address to be accessed or the tail address of the area to be accessed (i.e., the sum of the address to be accessed and the size of the area to be accessed) is not within the range of the user informing area indicated by the retrieved address translation table (i.e., within the area from an address obtained by adding the address of the inaccessible area to the gap size to an address obtained by adding the address of the inaccessible area and the gap size to the requested allocation size; refer to FIG. 18), it is found that an access is made to a gap in front of or behind of the user informing area. In this case, the user is warned of the access beyond the range, and the access instruction is skipped (S247).

Next, the status flag in the retrieved address translation table is looked up (S246). When the status flag is not in the "used status", this access is regarded to be made to an area that has never been allocated or that has already been deallocated. The user is warned of this, and the access instruction is skipped (S247).

When both the procedures in S245 and S246 are found to be NO, it is possible to allow the execution of the access instruction through the definition by a person who practices the invention.

When all the procedures in S244, S245 and S246 are found to be YES, address translation described below is executed, and then the user register is restored. The procedure then returns to an instruction subsequent to the instruction having caused the interrupt of the user program. This procedure is not required when the user register is stored in calling the interrupt handler by the OS.

Figure 25:
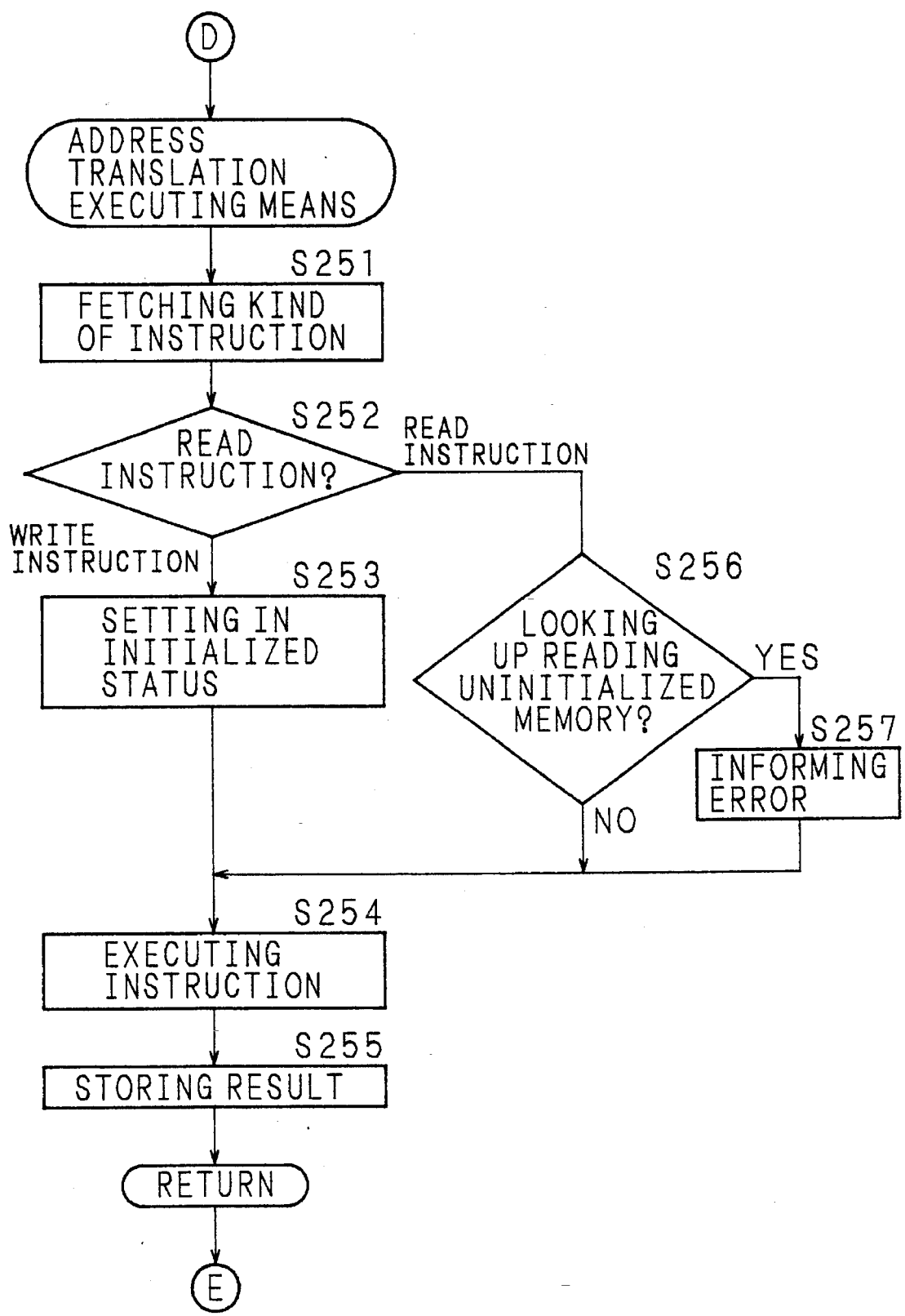
FIG. 25 is a flowchart for address translation executing means of the invention.

Address translation executing means:

FIG. 25 is a flowchart for the processing procedures of the address translation executing means. This means processes the address and the size of the area to be accessed obtained by the inaccessible area access detecting means in the following manner:

First, from the instruction for accessing to an inaccessible area, the kind of the instruction such as read and write is fetched (S251). Then, it is determined whether the instruction is a read instruction or a write instruction (S252). When it is a read instruction, the status of a bit in the initialization status management bit map corresponding to the address and the size of the area to be accessed is looked up (S256). When the corresponding bit in the initialization status management bit map is in the uninitialized status, it is found that an uninitialized memory is to be read. Therefore, a warning is generated for the user (error informing; S257).

When the memory access instruction is determined to be a write instruction in the procedure of S252, the status of a bit in the initialization status management bit map corresponding to the address and the size of the area to be accessed is set in the initialized status (S253).

After the procedures of S253 and S257, or when the check in the procedure of S256 has found that it is not the read of an uninitialized memory, the instruction is executed (S254). At this point, the address to be accessed is translated into a real address by using the following equation, based on the addresses of the inaccessible area and the real area in the address translation table, and an access is made to the obtained real address:

Real address to be accessed

=Address fetched from the instruction−Address of the inaccessible area+Address of the real area After executing the memory access instruction in the above-mentioned manner, the register modified by the memory access is stored in a register storage area in the user program (S255).

According to the present invention, the following incorrect or invalid accesses can be detected:

A memory access beyond the range of a dynamically allocated memory;

Execution of a read instruction before executing a write instruction in a dynamically allocated memory; and An access to a dynamically allocated memory that has already been deallocated.

Furthermore, since neither a static data nor a stack data is checked in the invention, the hardware is not wastefully occupied by the checking mechanism for these data, resulting in shortening an execution time of a user program.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method of detecting an invalid access to a memory associated with a user program, the memory including a dynamic memory, said invalid access being defined to include a request for allocating the dynamic memory and accessing the dynamic memory, said method comprising the steps of:

setting an inaccessible address area and obtaining a real memory address area corresponding to said inaccessible address area in response to a request for allocating the dynamic memory, as well as creating an address translation table for translating an address in said inaccessible address area into an address in said real memory address area; and determining whether or not an access to the dynamic memory is invalid based on an address for accessing said dynamic memory from said user program, the address in said inaccessible address area, and said address translation table, when said user program is executed.

2. A method of detecting an invalid access according to claim 1, further comprising the steps of:

detecting whether or not said access to the dynamic memory from said user program is an access to said inaccessible address area; and executing an interruption process when the access is determined to be an access to said inaccessible address area.

3. A method of detecting an invalid access according to claim 2, further comprising the step of:

translating the address to be accessed which said address translation table by executing an interrupt process when the access to said dynamic memory from said user program is found to be an access to said inaccessible address area so as to access said real memory address area.

4. A method of detecting an invalid access according to claim 3, further comprising the step of:

generating a warning when an address obtained by translating the address to be accessed in accordance with said address translation table does not correspond to said real memory address area.

5. A method of detecting an invalid access according to claim 3, further comprising the step of:

generating a warning when there is no address translation table corresponding to the address to be accessed.

6. A method of detecting an invalid access according to claim 1, further comprising the step of:

generating a warning when a status flag of said address translation table, said status flag indicating a used or unused state of said real memory address area subject to said address translation table, indicates that the real memory is in the unused status with respect to the address to be accessed.

7. A method of detecting an invalid access according to claim 1, wherein a retrieval control link of said address translation table is configured in a binary tree mode.

8. A method of detecting an invalid access according to claim 1, wherein a retrieval control link of said address translation table is configured in a serial link mode.

9. A method of detecting an invalid access to a memory associated with a user program, the memory including dynamic memory, said invalid access being defined to include a request for allocating the dynamic memory, an access to the dynamic memory and a request for deallocating the dynamic memory, said method comprising the steps of:

setting an inaccessible address area and obtaining a real memory address area corresponding to said inaccessible address area in response to the request for allocating the dynamic memory, as well as creating an address translation table for translating an address in said inaccessible address area into an address in said real memory address area, said address translation table having a status flag for indicating a used or unused status of said real memory address area subject to said address translation table;

determining whether or not an access to the dynamic memory is invalid based on an address for accessing the dynamic memory from said user program, an address in said inaccessible address area, and said address translation table, when said user program is executed; and placing a status flag of a corresponding area in said address translation table in the unused status in response to said request for deallocating the dynamic memory.

10. A method of detecting an invalid access according to claim 9, further comprising the steps of:

detecting whether or not said access to the dynamic memory from said user program is an access to said inaccessible address area; and executing an interruption process when the access is determined to be an access to said inaccessible address area.

11. A method of detecting an invalid access according to claim 10, further comprising the step of:

translating the address to be accessed which said address translation table by executing an interrupt process when the access to said dynamic memory from said user program is found to be an access to said inaccessible area so as to access said real memory address area.

12. A method of detecting an invalid access according to claim 11, further comprising the step of:

generating a warning when an address obtained by translating the address to be accessed in accordance with said address translation table does not correspond to said real memory area.

13. A method of detecting an invalid access according to claim 11, further comprising the step of:

generating a warning when there is no address translation table corresponding to the address to be accessed.

14. A method of detecting an invalid access according to claim 9, further comprising the step of:

generating a warning when said status flag in said address translation table including the address to be accessed is in the unused status.

15. A method of detecting an invalid access according to claim 9, wherein a retrieval control link of said address translation table is configured in a binary tree mode and a serial link mode.

16. A system for detecting an invalid access to a dynamic memory in a computer where a user program including a request for allocating the dynamic memory, an access to the dynamic memory and a request for deallocating the dynamic memory is executed, comprising:

address translation table creating means for setting an inaccessible address area and obtaining a real memory address area corresponding to said inaccessible address area in response to the request for allocating the dynamic memory, as well as creating an address translation table for translating an address in said inaccessible address area into an address in said real memory address area;

inaccessible area address informing means for informing said user program of the address in said inaccessible address area set by the address translation table creating means, in response to the request for allocating the dynamic memory thereby allowing the user program to detect an accessing point to the dynamic memory;

dynamic memory allocating means for allocating the dynamic memory in response to said address translation table creating means and said inaccessible area address informing means in response to the request for allocating the dynamic memory;

inaccessible area access detecting means for detecting an invalid access by retrieving said address translation table for an address to be accessed when an access to the address in said inaccessible address area informed said user program is detected;

address translation executing means for translating the address in said inaccessible area into the address in said real memory address area based on a result of the retrieval by said inaccessible area access detecting means, so as to execute the access; and dynamic memory deallocating means for operating said address translation table in response to the request for deallocating the dynamic memory, so as to place a memory area corresponding to said dynamic memory in a deallocated unused status.

17. A system for detecting an invalid access according to claim 16, wherein said computer includes a CPU and a PMMU, said inaccessible area access detecting means includes said PMMU, and said PMMU interrupts said CPU when said PMMU has detected that the address to be accessed is an address in said inaccessible area.

18. A system for detecting an invalid access according to claim 16, further comprising:

means for substantially replacing means for allocating/deallocating a dynamic memory previously provided in a system library with said dynamic memory allocating means and said dynamic memory deallocating means.

* * * * *